US009946793B2

(12) United States Patent
Zhan

(10) Patent No.: US 9,946,793 B2
(45) Date of Patent: Apr. 17, 2018

(54) METHOD FOR PROVIDING ELECTRONIC BOOK AND CLOUD SERVER

(71) Applicant: BEIJING BAIDU NETCOM SCIENCE AND TECHNOLOGY CO., LTD., Beijing (CN)

(72) Inventor: Jun Zhan, Beijing (CN)

(73) Assignee: Beijing Baidu Netcom Science And Technology Co., Ltd., Beijing (CN)

( * ) Notice: Subject to any disclaimer, the term of this patent is extended or adjusted under 35 U.S.C. 154(b) by 94 days.

(21) Appl. No.: 14/408,938

(22) PCT Filed: Dec. 6, 2013

(86) PCT No.: PCT/CN2013/088803
§ 371 (c)(1),
(2) Date: Dec. 17, 2014

(87) PCT Pub. No.: WO2014/090119
PCT Pub. Date: Jun. 19, 2014

(65) Prior Publication Data
US 2015/0293999 A1 Oct. 15, 2015

(30) Foreign Application Priority Data

Dec. 12, 2012 (CN) .......................... 2012 1 0537593
Nov. 4, 2013 (CN) .......................... 2013 1 0538387

(51) Int. Cl.
*G06F 17/30* (2006.01)
*G06F 17/22* (2006.01)
*G06F 17/24* (2006.01)

(52) U.S. Cl.
CPC .... *G06F 17/30864* (2013.01); *G06F 17/2241* (2013.01); *G06F 17/24* (2013.01);
(Continued)

(58) Field of Classification Search
CPC .................................................. G06F 17/3089
See application file for complete search history.

(56) References Cited

U.S. PATENT DOCUMENTS

2003/0221170 A1* 11/2003 Yagi ...................... G06F 17/212
715/251
2004/0201569 A1* 10/2004 Seet ...................... G06F 3/0483
345/156

(Continued)

FOREIGN PATENT DOCUMENTS

CN 101334784 A 12/2008
CN 103020226 A 4/2013
(Continued)

OTHER PUBLICATIONS

PCT/CN2013/088803 English Translation of the International Search Report dated Mar. 20, 2014, 3 pages.
(Continued)

*Primary Examiner* — Grace Park
(74) *Attorney, Agent, or Firm* — Lathrop Gage LLP

(57) ABSTRACT

A method for providing an electronic book and a cloud server are provided. The method comprises S1: receiving a query; S2: performing a search according to the query; and S3: generating the electronic book according to a search result responsive to the search.

15 Claims, 5 Drawing Sheets

(52) U.S. Cl.
CPC .... *G06F 17/30011* (2013.01); *G06F 17/3053* (2013.01); *G06F 17/3089* (2013.01); *G06F 17/30489* (2013.01)

(56) References Cited

U.S. PATENT DOCUMENTS

| | | | |
|---|---|---|---|
| 2007/0255702 A1* | 11/2007 | Orme | G06F 17/30696 |
| 2008/0140608 A1* | 6/2008 | Takahashi | G06F 17/30637 |
| 2009/0024604 A1 | 1/2009 | Zhao et al. | |
| 2011/0195388 A1* | 8/2011 | Henshall | G09B 5/062 |
| | | | 434/317 |
| 2012/0109884 A1 | 5/2012 | Goldentouch | |
| 2013/0041879 A1 | 2/2013 | Moser | |
| 2013/0173408 A1* | 7/2013 | Lindblom | G06Q 30/0283 |
| | | | 705/26.1 |

FOREIGN PATENT DOCUMENTS

| | | |
|---|---|---|
| CN | 103077238 A | 5/2013 |
| EP | 0834822 A2 | 4/1998 |
| JP | H10254912 A | 9/1998 |
| JP | 2003337825 A | 11/2003 |
| JP | 2011253416 A | 12/2011 |
| KR | 20120119885 A | 10/2012 |

OTHER PUBLICATIONS

Chinese Patent Application No. 201310538387.1 Decision for Rejection dated Feb. 3, 2017 (translation not available), 11 pages.
Chinese Patent Application No. 201310538387.1 First Office Action dated Mar. 3, 2016 with English translation, 41 pages.
Chinese Patent Application No. 201310538387.1 Second Office Action dated Oct. 9, 2016 with English translation, 34 pages.
European Patent Application No. 13863553.7 Extended Search report and opinion dated Feb. 25, 2016, 8 pages.
European Patent Application No. 13863553.7 Communication pursuant to Article 94(3) EPC dated Mar. 2, 2017, 6 pages.
Japanese Patent Application No. 2015-518842 Notification of Reasons for Refusal dated Dec. 24, 2015, with English translation, 6 pages.
Korean Patent Applicatoin No. 10-2014-7037024 Notification of Reasons for Refusal dated Jul. 11, 2016 with English translation, 13 pages.

\* cited by examiner

METHOD FOR PROVIDING ELECTRONIC BOOK AND CLOUD SERVER

CROSS-REFERENCE TO RELATED APPLICATIONS

This U.S. application claims priority under 35 U.S.C. 371 to, and is a U.S. National Phase application of, the International Patent Application No. PCT/CN2013/088803, filed Dec. 6, 2013, which claims the benefits of prior Chinese Applications No. 201210537593.6 filed Dec. 12, 2012, and No. 201310538387.1 filed Nov. 4, 2013. The entire contents of the above-mentioned patent applications are incorporated by reference as part of the disclosure of this U.S. application.

FIELD

Embodiments of the present disclosure generally relate to a computer application technology, and more particularly, to a method and system for providing an electronic book and a cloud server.

BACKGROUND

With a rapid development of computer and network technology, a search engine has gradually become the most important, the quickest and the most convenient means for obtaining information by people, in which a user inputs a query into the search engine, and then the search engine can return a search result responsive to the query to the user.

Current search engine mode either in a PC (Personal Computer) or in a mobile terminal is a real-time synchronization mode, i.e. the search result provided for the user must be viewed in real time by a browser. However, in many scenes, or for many users, it is desirable to view the search result in an asynchronous mode. That is, the search result obtained can be viewed when the user wants to view or can be viewed at a convenient time. However, the current search engine with the synchronization mode cannot meet such a requirement. To have a clear understanding for the present disclosure, a few examples regarding this requirement are as follows:

EXAMPLE 1 the user needs to write a paper about a certain type of knowledge, and therefore the user needs to view large amounts of data to accumulate materials. Assuming the user inputs a query "Lagrange" into the search engine, a large number of search results can be obtained. The user needs to spend a lot of time to browse these search results and to find the information which is needed, however, the current search engine with the synchronization mode only displays the search results in real time on the browser. So, there are some problems: on the one hand, it is not convenient for the user to view the search results for a long time or at any time; on the other hand, it is not easy for the user to reserve the search results.

EXAMPLE 2 when the user inputs the query for performing a search by a mobile terminal such as a mobile phone, in order to save phone traffic, the user wants to perform the search under WiFi environment. However, the search results can also be limited to be viewed under WiFi environment in the current search engine with the synchronization mode, otherwise, a lot of phone traffic can be wasted. At this time, there is an asynchronously viewing requirement of the user after the search results are obtained.

EXAMPLE 3 when the user inputs the query for performing the search by a fixed terminal such as PC, the user must continue to view the search results on the fixed terminal such as PC. However, the user wants to view the search results obtained on PC at anytime, anywhere, for example, these search results can be viewed by the mobile terminal during a business trip. But the current search engine with the synchronization mode cannot meet this asynchronously viewing requirement.

SUMMARY

Embodiments of the present disclosure seek to solve at least one of the problems existing in the related art to at least some extent.

Accordingly, a first objective of the present disclosure is to provide a method for providing an electronic book. With the method for providing the electronic book according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met.

A second objective of the present disclosure is to provide a system for providing an electronic book.

A third objective of the present disclosure is to provide another system for providing an electronic book.

A fourth objective of the present disclosure is to provide a cloud server.

A fifth objective of the present disclosure is to provide another method for providing an electronic book.

In order to achieve above objectives, according to embodiments of a first aspect of the present disclosure, a method for providing an electronic book is provided. The method for providing the electronic book comprises steps of: S1: receiving a query; S2: performing a search according to the query; and S3: generating the electronic book according to a search result responsive to the search.

In addition, the method for providing the electronic book according to the above embodiments of the present disclosure may also have the following additional technical features.

In some embodiments, step S3 comprises: S31: aggregating a plurality of search results and generating the electronic book.

In some embodiments, the method further comprises steps of: S4: displaying the electronic book as the search result; or sending the electronic book to a pre-specified client, a pre-specified network disk or a pre-specified mobile terminal.

In some embodiments, step S31 comprises: S311: extracting a candidate search result from the plurality of search results; S312: after deduplicating the candidate search result and/or removing an irrelevant content from the candidate search result, merging and automatically typesetting the candidate search result deduplicated and/or removed to generate the electronic book.

In some embodiments, step S311 comprises: according to first similarities between the plurality of search results and the query, extracting the search result whose first similarity meets a preset first similarity request as the candidate search result; or according to source authoritative statuses of the plurality of search results, extracting the search result whose source authoritative status meets a preset request as the candidate search result; or according to a ranking result of the plurality of search results, extracting first M search results as the candidate search result, in which M is a preset positive integer.

In some embodiments, the method further comprises steps of: obtaining a type of the client and adjusting a layout mode of the electronic book according to the type of the client.

In some embodiments, the method further comprises steps of: obtaining a piece of first copyright information of the plurality of search results and a piece of permission information of a user; and generating a piece of second copyright information of the electronic book according to the piece of first copyright information and managing an operation permission of the user for the electronic book according to the piece of permission information of the user.

In some embodiments, managing the operation permission of the user for the electronic book according to the piece of permission information of the user comprises: storing the electronic book in a cloud server as a mother book; generating a child book corresponding to the mother book according to the mother book and the type of the client and sending the child book to the client.

In some embodiments, the child book comprises a child information file and the child information file records a position of a page of a content in the child book in the mother book.

In some embodiments, the method further comprises steps of: receiving by the client an operation instruction; obtaining by the client a position of a content corresponding to the operation instruction in the mother book according to the child information file and obtaining by the client the content corresponding to the operation instruction from the cloud server according to the position.

In some embodiments, the method further comprises steps of: checking a content provided by a copyright owner and adding the content approved into the electronic book; or after calculating second similarities between the contents provided by the copyright owner and the query, adding the content provided by the copyright owner whose second similarity meets a preset second similarity request into the electronic book.

In some embodiments, the method further comprises steps of: assigning a unique serial number PKN to the electronic book after the electronic book is generated; changing a version number of the electronic book and keeping the unique serial number PKN of the electronic book unchanged, if the electronic book is updated.

In some embodiments, step S4 comprises: providing a read button or a download button for the electronic book on a search result page.

In some embodiments, the read button or the download button is in a form of a two-dimensional code or a link.

In some embodiments, the method further comprises steps of: establishing a community for a user reading or downloading the electronic book or publishing the electronic book, if an amount of downloads or readings of the electronic book is greater than a preset threshold.

In some embodiments, the method further comprises steps of: sending an update notification and pushing an updated electronic book, if the electronic book is updated.

According to embodiments of a second aspect of the present disclosure, a system for providing an electronic book is provided. The system for providing the electronic book comprises: a cloud server, configured to receive a query, to perform a search according to the query, and to generate the electronic book according to a search result responsive to the search.

In addition, the system for providing the electronic book according to the above embodiments of the present disclosure may also have the following additional technical features.

In some embodiments, the system further comprises: a first client, configured to receive the query input by a user and to send the query to the cloud server.

In some embodiments, the first client is further configured to receive the electronic book provided by the cloud server.

In some embodiments, the system further comprises: a second client, configured to receive the electronic book provided by the cloud server.

In some embodiments, the cloud server provides the electronic book as the search result to the first client or the second client.

According to embodiments of a third aspect of the present disclosure, a system for providing an electronic book is provided. The system for providing the electronic book comprises: a cloud server, configured to receive a query, to perform a search according to the query, and to generate the electronic book according to a search result responsive to the search; a client, configured to receive the query input by a user, to send the query to the cloud server and to receive the electronic book provided by the cloud server.

In addition, the system for providing the electronic book according to the above embodiments of the present disclosure may also have the following additional technical features.

In some embodiments, the cloud server is configured to perform the search according to the query to generate a plurality of search results, to aggregate the plurality of search results and to generate the electronic book, and to provide the electronic book for the user.

In some embodiments, the cloud server is configured to display the electronic book as the search result, or to send the electronic book to a pre-specified client, a pre-specified network disk or a pre-specified mobile terminal.

In some embodiments, the cloud server is configured to extract a candidate search result from the plurality of search results, and after deduplicating the candidate search result and/or removing an irrelevant content from the candidate search result, to merge and automatically typeset the candidate search result deduplicated and/or removed to generate the electronic book.

In some embodiments, the cloud server is configured to: according to first similarities between the plurality of search results and the query, extract the search result whose first similarity meets a preset first similarity request as the candidate search result; or according to source authoritative statuses of the plurality of search results, extract the search result whose source authoritative status meets a preset request as the candidate search result; or according to a ranking result of the plurality of search results, extract first M search results as the candidate search result, in which M is a preset positive integer.

In some embodiments, the cloud server is further configured to obtain a type of the client and to adjust a layout mode of the electronic book according to the type of the client.

In some embodiments, the cloud server is further configured to obtain a piece of first copyright information of the plurality of search results and a piece of permission information of the user, to generate a piece of second copyright information of the electronic book according to the piece of first copyright information, and to manage an operation permission of the user for the electronic book according to the piece of permission information of the user.

In some embodiments, the cloud server is configured to store the electronic book in the cloud server as a mother book, to generate a child book corresponding to the mother book according to the mother book and the type of the client, and to send the child book to the client.

In some embodiments, the child book comprises a child information file and the child information file records a position of a page of a content in the child book in the mother book.

In some embodiments, the client is further configured to receive an operation instruction, to obtain a position of a content corresponding to the operation instruction in the mother book according to the child information file, and to obtain the content corresponding to the operation instruction from the cloud server according to the position.

In some embodiments, the cloud client is further configured to check a content provided by a copyright owner and to add the content approved into the electronic book; or after calculating second similarities between the contents provided by the copyright owner and the query, to add the content provided by the copyright owner whose second similarity meets a preset second similarity request into the electronic book.

In some embodiments, the cloud client is further configured to assign a unique serial number PKN to the electronic book after the electronic book is generated, to change a version number of the electronic book and to keep the unique aerial number PKN of the electronic book unchanged, if the electronic book is updated.

In some embodiments, the cloud client is configured to provide a read button or a download button for the electronic book on a search result page.

In some embodiments, the read button or the download button is in a form of a two-dimensional code or a link.

In some embodiments, the cloud client is further configured to establish a community for the user reading or downloading the electronic book or to publish the electronic book, if an amount of downloads or readings of the electronic book is greater than a preset threshold.

In some embodiments, the cloud client is further configured to send an update notification and push an updated electronic book, if the electronic book is updated.

According to embodiments of a fourth aspect of the present disclosure, a cloud server is provided. The cloud server comprises: a receiving module, configured to receive a query; a search performing module, configured to perform a search according to the query; and an electronic book generating module, configured to generate an electronic book according to a search result responsive to the search.

In addition, the cloud server according to the above embodiments of the present disclosure may also have the following additional technical features.

In some embodiments, the search performing module is configured to perform the search according to the query to generate a plurality of search results; the electronic book generating module is configured to aggregate the plurality of search results and to generate the electronic book.

In some embodiments, the electronic book generating module is configured to extract a candidate search result from the plurality of search results, and after deduplicating the candidate search result and/or removing an irrelevant content from the candidate search result, to merge and automatically typeset the candidate search result deduplicated and/or removed to generate the electronic book.

In some embodiments, the cloud server further comprises: an electronic book providing module, configured to display the electronic book as the search result, or to send the electronic book to a pre-specified client, a pre-specified network disk or a pre-specified mobile terminal.

In some embodiments, the electronic book generating module is configured to: according to first similarities between the plurality of search results and the query, extract the search result whose first similarity meets a preset first similarity request as the candidate search result; or according to source authoritative statuses of the plurality of search results, extract the search result whose source authoritative status meets a preset request as the candidate search result; or according to a ranking result of the plurality of search results, extract first M search results as the candidate search result, in which M is a preset positive integer.

In some embodiments, the cloud server further comprises: a first obtaining module, configured to obtain a type of the client; a typesetting module, configured to adjust a layout mode of the electronic book according to the type of the client.

In some embodiments, the cloud server further comprises: a second obtaining module, configured to obtain a piece of first copyright information of the plurality of search results and a piece of permission information of the user; a managing module, configured to generate a piece of second copyright information of the electronic book according to the piece of first copyright information and to manage an operation permission of the user for the electronic book according to the piece of permission information of the user.

In some embodiments, the managing module is configured to store the electronic book in the cloud server as a mother book, to generate a child book corresponding to the mother book according to the mother book and the type of the client, and to send the child book to the client via the electronic book providing module.

In some embodiments, the child book comprises a child information file and the child information file records a position of a page of a content in the child book in the mother book.

In some embodiments, the client is configured to receive an operation instruction, to obtain a position of a content corresponding to the operation instruction in the mother book according to the child information file, and to obtain the content corresponding to the operation instruction from the cloud server according to the position.

In some embodiments, the cloud server further comprises: an extending module, configured to check a content provided by a copyright owner and to add the content approved into the electronic book; or after calculating second similarities between the contents provided by the copyright owner and the query, to add the content provided by the copyright owner whose second similarity meets a preset second similarity request into the electronic book.

In some embodiments, the cloud server further comprises: an assigning module, configured to assign a unique serial number PKN to the electronic book after the electronic book is generated, to change a version number of the electronic book and to keep the unique aerial number PKN of the electronic book unchanged, if the electronic book is updated.

In some embodiments, the electronic book providing module is configured to provide a read button or a download button for the electronic book on a search result page.

In some embodiments, the read button or the download button is in a form of a two-dimensional code or a link.

In some embodiments, the cloud server further comprises: a community establishing and publishing module, configured to establish a community for a user reading or downloading the electronic book or to publish the electronic book, if an amount of downloads or readings of the electronic book is greater than a preset threshold.

In some embodiments, the cloud server further comprises: an updating module, configured to send an update notification and push an updated electronic book, if the electronic book is updated.

According to embodiments of a fifth aspect of the present disclosure, a method for providing an electronic book is provided. The method for providing the electronic book comprises steps of: S1: sending a query to a cloud server; S2: receiving the electronic book sent and provided by the cloud server according to the query.

In addition, the method for providing the electronic book according to the above embodiments of the present disclosure may also have the following additional technical features.

In some embodiments, step S2 comprises: S21: performing by the cloud server a search according to the query to generate a plurality of search results; S22: aggregating by the cloud server the plurality of search results and generating by the cloud server the electronic book; S23: providing by the cloud server the electronic book to a user.

In some embodiments, step S22 comprises: S221: extracting a candidate search result from the plurality of search results; S223: after deduplicating the candidate search result and/or removing an irrelevant content from the candidate search result, merging and automatically typesetting the candidate search result deduplicated and/or removed to generate the electronic book.

In some embodiments, step S221 comprises: according to first similarities between the plurality of search results and the query, extracting the search result whose first similarity meets a preset first similarity request as the candidate search result; or according to source authoritative statuses of the plurality of search results, extracting the search result whose source authoritative status meets a preset request as the candidate search result; or according to a ranking result of the plurality of search results, extracting first M search results as the candidate search result, in which M is a preset positive integer.

In some embodiments, the method further comprises step of: obtaining by the cloud server a type of the client, and adjusting by the cloud server a layout mode of the electronic book according to the type of the client.

In some embodiments, the method further comprises step of: obtaining by the cloud server a piece of first copyright information of the plurality of search results and a piece of permission information of the user; generating by the cloud server a piece of second copyright information of the electronic book according to the piece of first copyright information and managing an operation permission of the user for the electronic book according to the piece of permission information of the user.

In some embodiments, managing the operation permission of the user for the electronic book according to the piece of permission information of the user comprises: storing the electronic book in a cloud server as a mother book; generating a child book corresponding to the mother book according to the mother book and the type of the client and sending the child book to the client.

In some embodiments, the child book comprises a child information file and the child information file records a position of a page of a content in the child book in the mother book.

In some embodiments, the method further comprises step of: receiving by the client an operation instruction; obtaining by the client a position of a content corresponding to the operation instruction in the mother book according to the child information file and obtaining by the client the content corresponding to the operation instruction from the cloud server according to the position.

In some embodiments, the method further comprises step of: assigning by the cloud server a unique serial number PKN to the electronic book after the electronic book is generated; changing by the cloud server a version number of the electronic book and keeping the unique serial number PKN of the electronic book unchanged, if the electronic book is updated.

In some embodiments, providing by the cloud server the electronic book to the user comprises: providing a read button or a download button for the electronic book on a search result page.

In some embodiments, the read button or the download button is in a form of a two-dimensional code or a link.

With the method and system for providing the electronic book and the cloud client according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
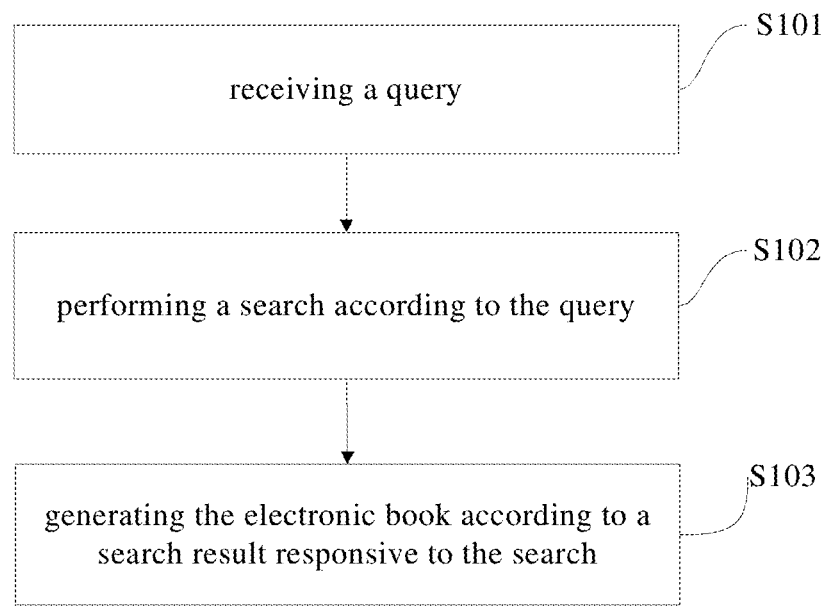
FIG. 1 is a flow chart of a method for providing an electronic book according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the specification, unless specified or limited otherwise, relative terms such as "longitudinal", "lateral", "up", "down", "front", "rear", "right", "left", "horizontal", "vertical", "top", "bottom" as well as derivative thereof should be construed to refer to the orientation as then described or as shown in the drawings under discussion. These relative terms are for convenience of description and do not require that the present disclosure be constructed or operated in a particular orientation.

In the description of the present disclosure, the term "a plurality of" means two or more than two, unless specified otherwise.

In the description of the present disclosure, the term "electronic book" means any forms of electronic reading carriers generated according to the search result, and electronic reading carriers can be run by the general reading software, for example, including but not limited to PDF, epub or mobi, or electronic reading carriers can be run by the professional reading software, for example, including but not limited to CAD, ERP and so on. The reading software for running electronic reading carriers can be specified by the user, or can also be recommended by the search engine or be specified by the search engine by default.

In the description of the present disclosure, the term "cloud server" has the search engine function, or gets help from the function of the current search engine, such as Baidu search engine, Google search engine and so on.

In the description of the present disclosure, the term "mother book" refers to the source code and the metadata provided by the author or the automatic editing system.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

A method and a system for providing an electronic book, a cloud server and a client according to an embodiment of the present disclosure will be described in the following with reference to the drawings.

FIG. 1 is a flow chart of a method for providing an electronic book according to an embodiment of the present disclosure. As shown in FIG. 1, the method includes following steps.

At step S101, a query is received. Specifically, the receiving of the query is completed by a cloud server, i.e. the cloud server obtains the query which is input or sent by a user, in which the user sends the query to the cloud server by a first client which includes but is not limited to a smart phone, a tablet PC, a PC, etc.

At step S102, a search is performed according to the query. In one embodiment, the cloud server performs the search according to the query to generate a plurality of search results. For example, the user sends the query "mobile phone" to the cloud server by the first client, and then the cloud server performs the search on the Internet and/or Baidu cloud storage platform by a search engine function to obtain the plurality of search results corresponding to the query "mobile phone", in which the cloud server is a server having the search engine function itself, or getting help from the conventional search engine, such as a Baidu search engine.

Figure 2:
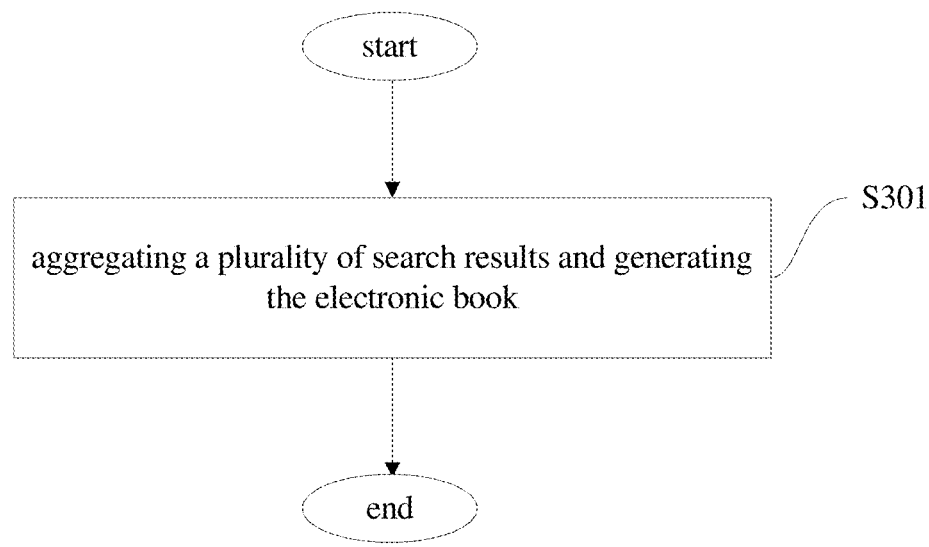
FIG. 2 is a flow chart of step S102 in method for providing the electronic book in FIG. 1 according to an embodiment of the present disclosure.

At step S103, the electronic book is generated according to a search result responsive to the search. In one embodiment, as shown in FIG. 2, the electronic book is generated by aggregating the plurality of search results, which specifically includes following steps:

At step S301, the plurality of search results is aggregated and the electronic book is generated. Specifically, aggregating the plurality of search results and generating the electronic book, include following steps:

(1) A candidate search result is extracted from the plurality of search results.

(2) After the candidate search result is deduplicated and/or an irrelevant content is removed from the candidate search result, the candidate search result deduplicated and/or removed is merged and automatically typeset to generate the electronic book.

Specifically, extracting the candidate search result from the plurality of search results can be performed using a variety of methods, which include, but are not limited to, at least one of the following methods:

Method 1: according to first similarities between the plurality of search results and the query, the search result whose first similarity meets a preset first similarity request is extracted as the candidate search result. For example, the search result whose first similarity is first M1 first similarities is extracted as the candidate search result, in which M1 is a preset positive integer; or the search result whose first similarity meets a preset similarity threshold is extracted as the candidate search result. A calculation of similarities between the plurality of search results and the query can adopt a calculation of similarities between the plurality of search results and the query by the conventional search engines, for example, ranking based on semantic similarities.

Method 2: according to source authoritative statuses of the plurality of search results, the search result whose source authoritative status meets a preset request is extracted as the candidate search result. For example, some websites can be set to have higher authoritative statuses, such as some websites containing papers, some well-known websites, and websites belonging to the same operating company as the search engine, etc.

Method 3: according to a ranking result of the plurality of search results, first M search results are extracted as the candidate search result, in which M is a preset positive integer. In this case, aggregating is performed according to the ranking result of the plurality of search results in the search engine, for example, first 20 search results in the search engine are extracted as the candidate search result.

After the candidate search result is extracted from the plurality of search results, the candidate search result is deduplicated and/or an irrelevant content is removed from the candidate search result. After the candidate search result is deduplicated and/or an irrelevant content is removed from the candidate search result, the candidate search result deduplicated and/or removed is merged and automatically typeset to generate the electronic book. The deduplication refers to reserving one of candidate search results with the same content and removing the others. The irrelevant content refers to, for example, a navigation bar of a webpage, copyright information at the bottom of the webpage, etc. Of course, only a content of the webpage in a few preset positions can be extracted as the candidate search result, such as a title and a text of the webpage can be extracted. The above-described content of the webpage can be obtained from a snapshot which is formed from the webpage crawled by the search engine, or can be obtained based on the URL (Uniform Resource Locator) in real time.

In addition, the URL of the search result in the electronic book can be reserved. When the user downloads the electronic book to a mobile terminal and then clicks the URL corresponding to the search result in the electronic book, the webpage corresponding to the URL can be opened and browsed by a browser in the mobile terminal if the mobile terminal is in a networked status. Alternatively, when the user reads the electronic book online in the PC and then clicks the URL corresponding to the search result in the electronic book, the webpage corresponding to the URL can be opened and browsed by a browser in the PC.

In general, the above-described plurality of search results aggregated to generate the electronic book according to an embodiment of the present disclosure can include one of the URL, an abstract, a title, a cached content, a webpage content obtained in real time according to the URL and a combination thereof. The above-described plurality of search results even can include some editable or interactive modules, such as an application containing the plurality of search results implemented in Baidu box calculation, in which the plurality of search results can be directly displayed to the user and can be directly interacted with the user. Further, the application or a link of the application can be embedded in the electronic book. When the user reads the electronic book online or reads the electronic book after the electronic book is downloaded, the user can interact with the application by clicking the application or by clicking the link of the application.

Finally, the electronic book corresponding to the query can be generated after the corresponding plurality of search results are typeset automatically. An automatically typesetting program can be xelatex typesetting program which is an open source program, or can be such as a book typesetting program from Founder Group, InDesign typesetting program from Adobe and so on. A piece of typesetting information can be saved after the plurality of search results are typeset. For example, a piece of typesetting information can be called reverse reference syntax file in xelatex typesetting program, in which a typesetting source code can be retrieved by the reverse reference syntax file.

A format of the electronic book generated by typesetting can include, but are not limited to PDF, epub, mobi, etc. PDF supports a rearrangement of a pattern and a layout of the electronic book, which can be used as a preferred format. Epub can achieve re-typesetting automatically according to a resolution of a reader, but a concept of the page is lost, inconsistent results can be seen on a variety of carriers, and collaborative editing can become complicated, so epub can be used as a sub-optimal format. Of course, other formats can be used in the electronic book, which are not enumerated here.

In some embodiments, the electronic book can be in a non-editable mode, such as PDF mode. In one preferred embodiment, after the electronic book is provided for the user, the user can re-edit a content of the electronic book. For example, the electronic book can be run by professional software such as ERP, etc., and then the electronic book can be modified by the user by the professional software to meet an individual need of the user.

The plurality of search results can be distinguished in a variety of ways during typesetting, for example, the search results can be regarded as separate chapters, or the search results can be distinguished by separators. Specifically, the electronic book can be typeset according to a type of the client to suit each type of client for browsing. More specifically, the type of the client (for example, the client used by the user) can be obtained and a layout mode of the electronic book can be adjusted according to the type of the client. In this embodiment, the electronic book can be generated automatically by re-typesetting online according to the type of the client. For example, the type of the smart phone is different from the type of the tablet PC, and the screen size of the smart phone is different from the screen size of the tablet PC, and thus the electronic book can be re-typeset online according to the screen size to form different layout modes for suiting different types of clients, so as to ensure that each type of client has a clear displaying for the electronic book.

In order to safeguard a copyright of the electronic book, the method according to an embodiment of the present disclosure further includes following steps: a piece of first copyright information of the plurality of search results and a piece of permission information of the user are obtained; and a piece of second copyright information of the electronic book is generated according to the piece of first copyright information, and an operation permission of the user for the electronic book is managed according to the piece of permission information of the user. Specifically, managing the operation permission of the user for the electronic book according to the piece of permission information of the user may include following steps: the electronic book is stored in the cloud server as a mother book; a child book corresponding to the mother book is generated according to the mother book and the type of the client, and sent to the client. The permission information can include a piece of page information of the mother book which is obtained by the client, for example, which can be obtained by user's login, i.e. the users can be divided into multiple levels, and different levels of users can have different levels of the permissions corresponding to different authorized scopes. In this way, after user's login, each user only can request the pages within the corresponding authorized scope, and cannot continuously request the text from the mother book (i.e. cannot request the text from the mother book for many times), otherwise the sense of safeguarding the copyright of the electronic book is lost.

In addition, the permission information also can include amount information of a content of the mother book obtained by the client. For example, amount information of the content of the mother book obtained by the client cannot exceed 50% of total amount information of the content of the mother book. Specifically, a request volume of all clients for the protected content can be recorded. The corresponding client can be locked if the request volume has exceeded a preset volume (such as 50%). When the client is locked, only the search can be performed by the user but the copy of the new page is limited. Thus, a safeguarding degree can be improved specifically.

In some embodiments, the child book includes a child information file and the child information file records a position of a page of a content in the child book in the mother book. The user-specified content can be obtained by the client from the cloud server according to the child information file of the child book. For example, an operation instruction (e.g., the operation instruction generated when the user performs a corresponding operation) is received by the client; a position of a content corresponding to the operation instruction in the mother book can be obtained by the client according to the child information file, and the content corresponding to the operation instruction from the cloud server can be obtained by the client according to the position. The operation instruction may be, for example, an instruction for copying or editing the content in the child book. Specifically, the child information file can be generated by the cloud server when the child book is generated according to the mother book. In particular, the child book may have one child information file, however, the child information files may be different due to different typesetting processes of the different child books. For example, for xelatex typesetting program, the child information file may be called the reverse reference syntax file, i.e. when the user clicks on PDF, the typesetting source code can be obtained by the reverse reference syntax file. The child information file records the position of pages of all texts and pictures of the child book in the mother book, which can be calculated by the x, y coordinate transformation. Therefore, the position of one page of the child book in the mother book can be obtained by the child information file. For example, after the operation instruction for copying contents of a certain page of the child book by the user via the client is obtained, the contents in the mother book in the corresponding position can be sent to the client according to the position of the contents of the certain page of the child book in the mother book, so a copy operation for the content can be achieved.

In order to enrich the content of the electronic book and to obtain information required by the user more easily, the electronic book generated by the described-above means can be expanded, i.e. a plurality of search results of a synonym or an expansion word corresponding to the query can be aggregated in the electronic book, and the synonym or the expansion word corresponding to the query can be associated with the electronic book, and the electronic book can be associated with the synonym or the expansion word after the electronic book is expanded. The synonym refers to the word which has the same or similar meaning corresponding to the query in a search log, for example, when the user inputs the query "lagelangri", the plurality of search results corresponding to the query "lagelangri" can be aggregated into the electronic book, and the plurality of search results corresponding to the synonym "Lagrange" can also be aggregated into the electronic book. The expansion word refers to the word which is recommended to the user by the search engine after the user inputs the query into the search engine, and the expansion word is usually displayed to the user in a drop-down box in the search engine, or provided for the user in the related search terms, more simply, can be the relevant entry or recommended entry of the Encyclopedia. For example, when the user inputs the query "Lagrange" in the search engine, not only can the plurality of search results corresponding to "Lagrange" be aggregated into the electronic book, but also the plurality of search results corresponding to the expansion word "Lagrangian function" can be aggregated into the electronic book. Thus, the electronic book can be associated with the words "lagelangri", "Lagrangian", and "Lagrangian function". Whether other users inputs "lagelangri" or "Lagrange" or "Lagrangian function", the corresponding electronic book can be hit.

In addition to expanding, the methods further includes the following step: a content provided by a copyright owner is checked and the content approved is added into the electronic book; or after calculating second similarities between the contents provided by the copyright owner and the query, the content provided by the copyright owner whose second similarity meets a preset second similarity request is added into the electronic book. Specifically, an interface can be supplied to the copyright owner such as a publisher or an author, and the copyright owner can provide the content via the interface, and after the similarities are calculated, the content meeting the requirements of similarities is added into the electronic book; or the content approved is added into the electronic book. In this way, a high-quality section of works can be offered by the copyright owner to be added into the electronic book. When the user browses the electronic book, benefits and potential profits can be brought to the copyright owner if the user is interested in the high-quality section of works which can stimulate the enthusiasm of user to buy works. Specifically, the publisher information or author information can be added into the electronic book, for example, contact info of the publisher or the author can be displayed in link in the electronic book, and the mobile terminal can be triggered to call service telephone by the user or a connection request can be initiated via the IM (Instant Messaging) client when the user clicks the service telephone or the IM client in the contact info, so as to contact with the customer service staffs of the publisher to ask special purchasing issues.

The electronic book can be saved after the electronic book is generated, and a unique serial number PKN can be assigned to the electronic book after the electronic book is generated. Thus, the electronic book can be proofread, updated or referenced according to the unique serial number PKN. Specifically, a version number of the electronic book is changed but the unique serial number PKN of the electronic book is kept unchanged if the electronic book is updated. In other words, even if the content of the electronic book is updated, the unique serial number PKN is not changed, only the version number of the electronic book is changed. The corresponding electronic book can be found by the unique serial number PKN for reading, downloading, reviewing, referencing, etc.

The electronic book is provided for the user after the plurality of search results are aggregated into the electronic book and the electronic book is generated.

Figure 3:
FIG. 3 is a schematic diagram of an electronic book provided for a client in a method for providing an electronic book according to an embodiment of the present disclosure.
Figure 4:
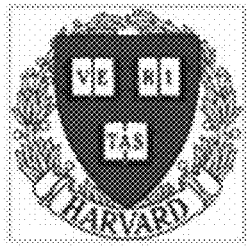
FIG. 4 is a schematic diagram of an electronic book provided for a client in a method for providing an electronic book according to an embodiment of the present disclosure.

Specifically, the electronic book is displayed as the search result, for example, the electronic book is displayed as the search result in the user's client. For example, the search is performed after the user inputs the query into the search engine by the client, the electronic book generated according to the plurality of search results can be displayed to the user as the search result in the client. As one example, as shown in FIG. 3, the user inputs the query "shishichuanshuo" in a search page, and the first search result which is displayed in first page of the plurality of search results is the electronic book corresponding to "shishichuanshuo" (i.e. micro-book). As another example, as shown in FIG. 4, the user inputs the query "hafodaxue" in a search page, and the first search result which is displayed in first page of the plurality of search results is the electronic book corresponding to "hafodaxue" (i.e. micro-book), the user can click the "micro-book" icon to obtain the electronic book corresponding to "hafodaxue".

Of course, the electronic book can be provided for the user in other ways. For example, the electronic book is sent to a pre-specified client, a pre-specified network disk or a pre-specified mobile terminal, or other devices pre-specified by the user. The pre-specified client may be the client which is used by the user to send the query, or the client which is used by the user to login in the cloud server. Specifically, the electronic book is sent to the client which is used by the user to send the query, i.e. assuming that the user sends the query to the cloud server by the first client, and then the cloud server sends the electronic book to the first client after the electronic book is generated. Alternatively, the electronic book is sent to the client which is used by the user to login in the cloud server, i.e. the electronic book is sent to a second client of other types. Alternatively, the electronic book is sent to the network disk of the user; or even the electronic book is sent to a user-specified device.

In addition, a means for providing the electronic book for the user may be as follows: a read button or a download button for the electronic book on a search result page is provided, and then the user can obtain the electronic book by the read button or the download button, in which the read button or the download button is in a form of a two-dimensional code or a link. Specifically, the read button or the download button of the electronic book can be provided for the user's terminal and the read button or the download button can be provided in the form of the link, and then the electronic book can be read or downloaded by clicking the link. Preferably, the read button or the download button can be provided in the form of the two-dimensional code which can be scanned by the user's terminal for reading or downloading the electronic book. Of course, the read button or the download button may be in other forms, which are not enumerated herein.

Figure 5:
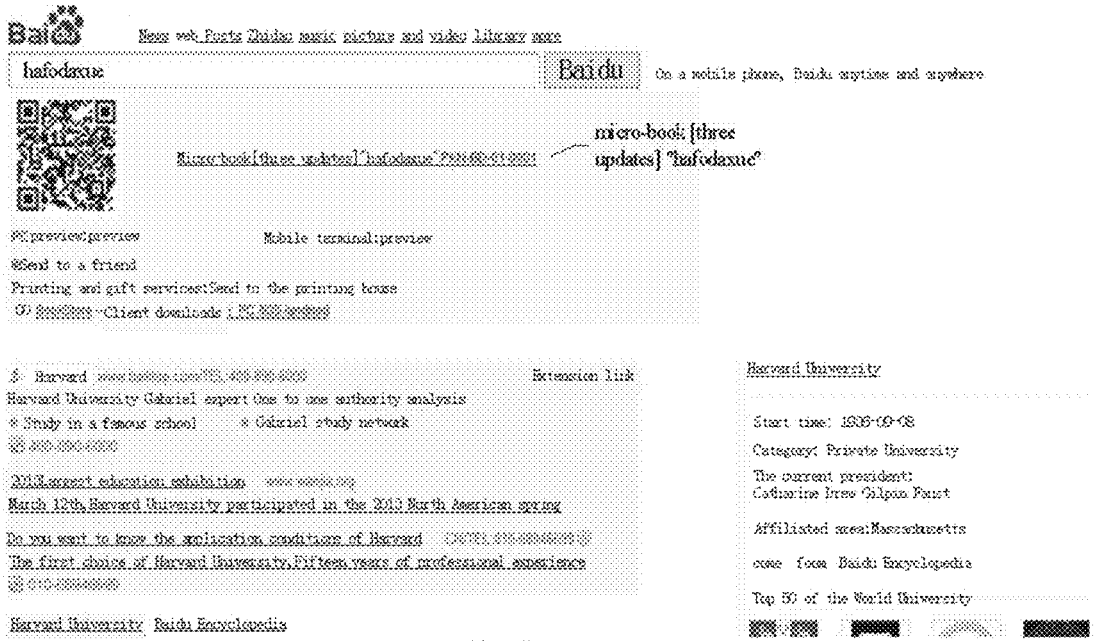
FIG. 5 is a schematic diagram of an electronic book provided for a client in a method for providing an electronic book according to an embodiment of the present disclosure.
Figure 6:
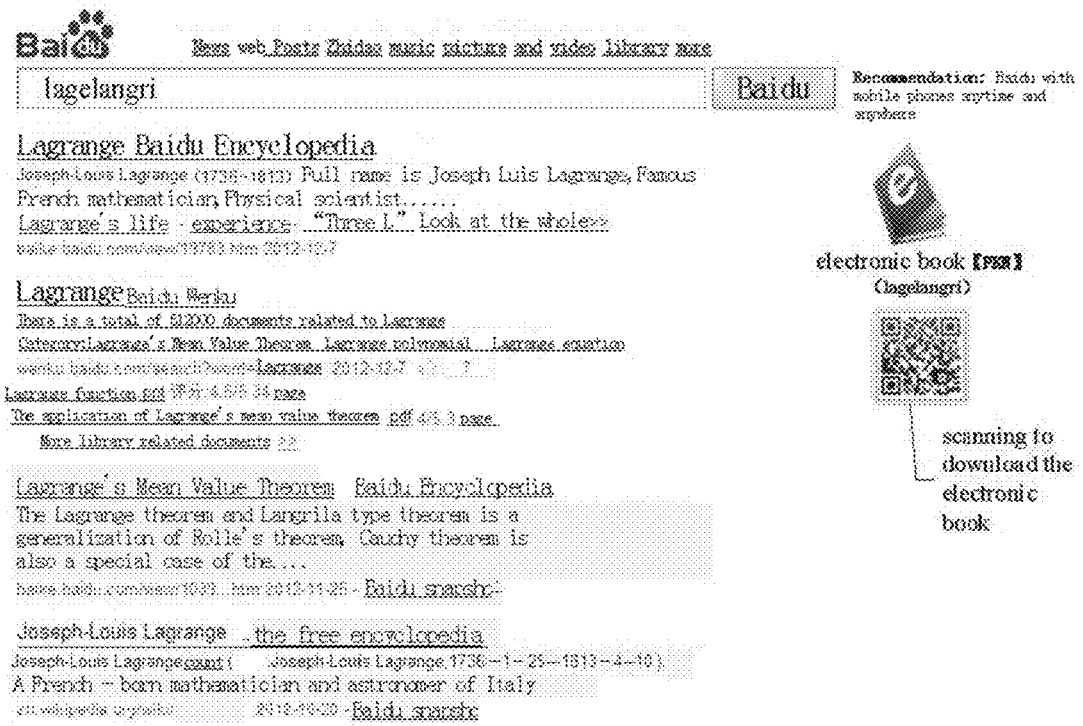
FIG. 6 is a schematic diagram of an electronic book provided for a client in a method for providing an electronic book according to an embodiment of the present disclosure.

After the electronic book is sent to the client, the position in the client for displaying the electronic book can be varied, as long as the user can view the electronic book conveniently. For example, the read button or the download button can be placed at the top of the plurality of search results, or be placed in a prominent right position of the plurality of search results, or be placed in a prominent position in the middle of the plurality of search results, etc. For example, as shown in FIG. 5, the user inputs the query "hafodaxue", the corresponding electronic book may be displayed at the top of the plurality of search results responsive to the search of the "hafodaxue", and the user scans the two-dimensional code of the corresponding electronic book by the mobile terminal or other clients and downloads the electronic book by the mobile terminal or other clients. Moreover, as shown in FIG. 6, the user inputs the query "lagelangri", the corresponding electronic book may be displayed in a prominent right position of the plurality of search results responsive to the search of the "lagelangri", and the user scans the two-dimensional code of the corresponding electronic book by the mobile terminal or other clients and downloads the electronic book by the mobile terminal or other clients.

As long as an electronic book reader or an application with a similar function is installed, the user will be able to open the electronic book which is downloaded by the mobile terminal or other clients at any time.

For the popular electronic book, for example, a community is established for a user reading or downloading the electronic book or the electronic book is published, if an amount of downloads or readings of the electronic book is greater than a preset threshold. That is, if an amount of downloads or readings of the electronic book reaches a preset amount, a small community can be established for the user reading or downloading the electronic book to communicate with each other, i.e. a post bar-style small community can be established for the user reading or downloading the electronic book to communicate with each other. In addition, the popular electronic book can be published if the amount of downloads or readings of the electronic book is greater than the preset threshold, i.e. the cloud server can publish the popular electronic book. In the above example, the preset threshold may be, for example, 500.

Due to the rapid changing of internet information, internet information often grows explosively, so every week the electronic book can be updated periodically according to the search results corresponding to the query associated with the electronic book, and the version number of the electronic book can be changed but the unique serial number PKN of the electronic book can be kept unchanged after each update. An update notification is sent to the user and the update electronic book is pushed to the user if the electronic book is updated. Thus, the user can determine whether to download the electronic book, and if the user decides to download the electronic book, the updated electronic book is pushed to the user. The updated electronic book can be sent to the client of the user and then supplied to the user in the form of the two-dimensional code or the link, so the user can scan the two-dimensional code by the terminal (client) to download or read the electronic book. As shown in FIG. 5, when the electronic book corresponding to the "hafodaxue" is updated, the electronic book, i.e. micro-book [three updates] "hafodaxue": PKN-BD-01-0001, can be displayed, and then the user scans the two-dimensional code by the client such as the mobile terminal and can download the updated electronic book in the mobile terminal.

There are some cases, for example, when some information can be changed by the copyright owner, such as modifying wrongly written characters, or adding a new page or deleting a page, etc., the version number of the electronic book cannot be changed, only the corresponding page can be changed, so the user traffic can be saved.

With the method for providing the electronic book according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met. After the cloud server generates the electronic book by aggregating the plurality of search results, a usage efficiency of the user can be improved, in which, after demo is measured, the usage efficiency brought by quick page turning can be increased by up to three times, and after processed by the professional typesetting software, the pages in the electronic book can be more beautiful, so an enthusiasm of the user for reading can be greatly increased. In addition, the biggest problem in the Internet is less high-quality content, and the content of the electronic book can integrate the content which is provided by the copyright owner such as the author or publisher, such that: on one hand, the laborious high-quality content can be incorporated into the Internet, on the other hand, the enthusiasm of the user for reading or buying printed works can be stimulated, so benefits can be brought to the copyright owner. The search in the mobile terminal and the PC are significantly different in the requirement, the advantages and the disadvantages. With the method for providing the electronic book according to embodiments of the present disclosure, the plurality of search results can be easily moved from the PC to the mobile terminal, and the user can be able to read the search results anytime, anywhere, and individual needs can be met, and the phone traffic can be saved. Further, information promotion can be carried out with the method, for example, the electronic book can be used as an excellent platform for inserting the promotion information, which can be similar to the beautiful illustrations in magazine and can be integrated with the content in the electronic book, so the user can accept the promotion information more easily and are unlikely to be disgusted with the promotion information compared to the promotion information inserted in the search result, and a huge space for displaying the promotion information can be provided.

Figure 7:
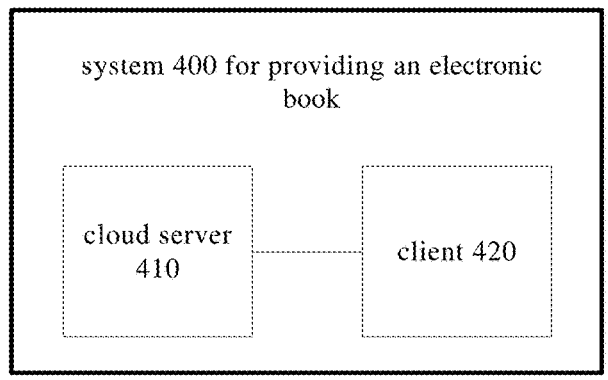
FIG. 7 is a block diagram of a system for providing an electronic book according to an embodiment of the present disclosure.

FIG. 7 is a block diagram of a system for providing an electronic book according to an embodiment of the present disclosure. As shown in FIG. 7, the system 400 for providing the electronic book according to an embodiment of the present disclosure includes a cloud server 410 and a client 420.

The cloud server 410 is configured to receive a query (for example, the query input or sent by a user), to perform a search according to the query, to generate the electronic book according to a search result responsive to the search, and to provide the electronic book for the user. The client 420 is configured to receive the query input by the user, to send the query to the cloud server 410, and to receive the electronic book provided by the cloud server 410.

Specifically, the user can send the query to the cloud server 410 by the client 420. The client 420 includes, but is not limited to, a smart phone, a tablet PC, a PC, etc, and the cloud server 410 is a server having the search engine function, or getting help from the conventional search engine, such as a Baidu search engine.

In one embodiment, the cloud server 410 is configured to perform the search according to the query to generate a plurality of search results, to aggregate the plurality of search results and to generate the electronic book, and to provide the electronic book for the user. For example, the user sends the query "mobile phone" to the cloud server 410 by the client 420, and then the cloud server 410 performs the search on the Internet and/or Baidu cloud storage platform by the search engine function to obtain the plurality of search results corresponding to the query "mobile phone".

The cloud server 410 is configured to aggregate the plurality of search results and to generate the electronic book, which specifically includes the following:

(1) A candidate search result is extracted from the plurality of search results.

(2) After the candidate search result is deduplicated and/or an irrelevant content is removed from the candidate search result, the candidate search result deduplicated and/or removed is merged and automatically typeset to generate the electronic book.

Specifically, extracting the candidate search result from the plurality of search results can be performed using a variety of methods, which include, but are not limited to, at least one of the following methods:

Method 1: according to first similarities between the plurality of search results and the query, the search result whose first similarity meets a preset first similarity request is extracted as the candidate search result. For example, the search result whose first similarity is first M1 first similarities is extracted as the candidate search result, in which M1 is a preset positive integer; or the search result whose first similarity meets a preset similarity threshold is extracted as the candidate search result. A calculation of similarities between the plurality of search results and the query can adopt a calculation of similarities between the plurality of search results and the query by the conventional search engines, for example, ranking based on semantic similarities.

Method 2: according to source authoritative statuses of the plurality of search results, the search result whose source authoritative status meets a preset request is extracted as the candidate search result. For example, some websites can be set to have higher authoritative statuses, such as some websites containing papers, some well-known websites, and websites belonging to the same operating company as the search engine, etc.

Method 3: according to a ranking result of the plurality of search results, first M search results are extracted as the candidate search result, in which M is a preset positive integer. In this case, aggregating is performed according to the ranking result of the plurality of search results in the search engine, for example, first 20 search results in the search engine are extracted as the candidate search result.

After the candidate search result is extracted from the plurality of search results, the candidate search result is deduplicated and/or an irrelevant content is removed from the candidate search result. After the candidate search result is deduplicated and/or an irrelevant content is removed from the candidate search result, the candidate search result deduplicated and/or removed is merged and automatically typeset to generate the electronic book. The deduplication refers to reserving one of candidate search results with the same content and removing the others. The irrelevant content refers to, for example, a navigation bar of a webpage, copyright information at the bottom of the webpage, etc. Of course, only a content of the webpage in a few preset positions can be extracted as the candidate search result, such as a title and a text of the webpage can be extracted. The above-described content of the webpage can be obtained from a snapshot which is formed from the webpage crawled by the search engine, or can be obtained based on the URL (Uniform Resource Locator) in real time.

In addition, the URL of the search result in the electronic book can be reserved. When the user downloads the electronic book to a mobile terminal (the client 420) and then clicks the URL corresponding to the search result in the electronic book, the webpage corresponding to the URL can be opened and browsed by a browser in the mobile terminal if the mobile terminal is in a networked status. Alternatively, when the user reads the electronic book online in the PC and then clicks the URL corresponding to the search result in the electronic book, the webpage corresponding to the URL can be opened and browsed by a browser in the PC.

In general, the above-described plurality of search results aggregated to generate the electronic book according to an embodiment of the present disclosure can include one of the URL, an abstract, a title, a cached content, a webpage content obtained in real time according to the URL and a combination thereof. The above-described plurality of search results even can include some editable or interactive modules, such as an application containing the plurality of search results implemented in Baidu box calculation, in which the plurality of search results can be directly displayed to the user and can be directly interacted with the user. Further, the application or a link of the application can be embedded in the electronic book. When the user reads the electronic book online or reads the electronic book after the electronic book is downloaded, the user can interact with the application by clicking the application or by clicking the link of the application.

Finally, the electronic book corresponding to the query can be generated after the corresponding plurality of search results are typeset automatically. An automatically typesetting program can be xelatex typesetting program which is an open source program, or can be such as a book typesetting program from Founder Group, InDesign typesetting program from Adobe and so on. A piece of typesetting information can be saved after the plurality of search results are typeset. For example, a piece of typesetting information can be called reverse reference syntax file in xelatex typesetting program, in which a typesetting source code can be retrieved by the reverse reference syntax file.

A format of the electronic book generated by typesetting can include, but are not limited to PDF, epub, mobi, etc. PDF supports a rearrangement of a pattern and a layout of the electronic book, which can be used as a preferred format. Epub can achieve re-typesetting automatically according to a resolution of a reader, but a concept of the page is lost, inconsistent results can be seen on a variety of carriers, and collaborative editing can become complicated, so epub can be used as a sub-optimal format. Of course, other formats can be used in the electronic book, which are not enumerated herein.

The plurality of search results can be distinguished in a variety of ways during typesetting, for example, the search results can be regarded as separate chapters, or the search results can be distinguished by separators. Specifically, the electronic book can be typeset by the cloud server 410 according to a type of the client 420 to suit each type of client 420 for browsing. More specifically, the type of the client 420 used by the user can be obtained by the cloud server 410 and a layout mode of the electronic book can be adjusted according to the type of the client 420. In this embodiment, the electronic book can be generated automatically by the cloud server 410 by re-typesetting online according to the type of the client 420. For example, the type of the smart phone is different from the type of the tablet PC, and the screen size of the smart phone is different from the screen size of the tablet PC, and thus the electronic book can be re-typeset online according to the screen size to form different layout modes for suiting different types of clients 420, so as to ensure that each type of client 420 has a clear displaying for the electronic book.

In order to safeguard a copyright of the electronic book, the cloud server 410 is configured to obtain a piece of first copyright information of the plurality of search results and a piece of permission information of the user, to generate a piece of second copyright information of the electronic book according to the piece of first copyright information, and to manage an operation permission of the user for the electronic book according to the piece of permission information of the user. Specifically, the electronic book is stored in the cloud server 410 as a mother book; a child book corresponding to the mother book is generated according to the mother book and the type of the client 420, and sent to the client 420. The permission information can include a piece of page information of the mother book which is obtained by the client 420, for example, which can be obtained by user's login, i.e. the users can be divided into multiple levels, and different levels of users can have different levels of the permissions corresponding to different authorized scopes. In this way, after user's login, each user only can request the pages within the corresponding authorized scope, and cannot continuously request the text from the mother book (i.e.

cannot request the text from the mother book for many times), otherwise the sense of safeguarding the copyright of the electronic book is lost.

In addition, the permission information also can include amount information of a content of the mother book which can be obtained by the client 420. For example, amount information of the content of the mother book obtained by the client 420 cannot exceed 50% of total amount information of the content of the mother book. Specifically, a request volume of all clients 420 for the protected content can be recorded by the cloud server 410. The corresponding client 420 can be locked if the request volume has exceeded a preset volume (such as 50%). When the client 420 is locked, only the search can be performed by the client 420 but the copy of the new page by the client 420 is limited. Thus, a safeguarding degree can be improved specifically.

In one embodiment, the child book includes a child information file and the child information file records a position of a page of a content in the child book in the mother book. The user-specified content can be obtained by the client 420 from the cloud server 410 according to the child information file of the child book. For example, an operation instruction (e.g., the operation instruction generated when the user performs a corresponding operation) is received by the client 420; a position of a content corresponding to the operation instruction in the mother book can be obtained by the client 420 according to the child information file, and the content corresponding to the operation instruction from the cloud server 410 can be obtained by the client 420 according to the position. The operation instruction may be, for example, an instruction for copying or editing the content in the child book. Specifically, the child information file can be generated by the cloud server 410 when the child book is generated according to the mother book. In particular, the child book may have one child information file, however, the child information files may be different due to different typesetting processes of the different child books. For example, for xelatex typesetting program, the child information file may be called the reverse reference syntax file, i.e. when the user clicks on PDF, the typesetting source code can be obtained by the reverse reference syntax file. The child information file records the position of pages of all texts and pictures of the child book in the mother book, which can be calculated by the x, y coordinate transformation. Therefore, the position of one page of the child book in the mother book can be obtained by the child information file. For example, after the operation instruction for copying contents of a certain page of the child book is obtained by the client 420, the contents in the mother book in the corresponding position can be sent to the client 420 according to the position of the contents of the certain page of the child book in the mother book, so a copy operation for the content can be achieved.

In order to enrich the content of the electronic book and to obtain information required by the user more easily, the electronic book generated by the described-above means can be expanded, i.e. a plurality of search results of a synonym or an expansion word corresponding to the query can be aggregated by the cloud server 410 into the electronic book, and the synonym or the expansion word corresponding to the query can be associated with the electronic book, and the electronic book can be associated with the synonym or the expansion word after the electronic book is expanded. The synonym refers to the word which has the same or similar meaning corresponding to the query in a search log, for example, when the user inputs the query "lagelangri", the plurality of search results corresponding to the query "lagelangri" can be aggregated into the electronic book, and the plurality of search results corresponding to the synonym "Lagrange" can also be aggregated into the electronic book. The expansion word refers to the word which is recommended to the user by the search engine after the user inputs the query into the search engine, and the expansion word is usually displayed to the user in a drop-down box in the search engine, or provided for the user in the related search terms, more simply, can be the relevant entry or recommended entry of the Encyclopedia. For example, when the user inputs the query "Lagrange" in the search engine, not only can the plurality of search results corresponding to "Lagrange" be aggregated into the electronic book by the cloud server 410, but also the plurality of search results corresponding to the expansion word "Lagrangian function" can be aggregated into the electronic book by the cloud server 410. Thus, the electronic book can be associated with the words "lagelangri", "Lagrangian", and "Lagrangian function". Whether other users inputs "lagelangri" or "Lagrange" or "Lagrangian function", the corresponding electronic book can be hit.

In addition to expanding, the cloud server 410 is further configured to check a content provided by a copyright owner and to add the content approved into the electronic book; or after calculating second similarities between the contents provided by the copyright owner and the query, to add the content provided by the copyright owner whose second similarity meets a preset second similarity request into the electronic book. Specifically, an interface can be supplied to the copyright owner such as a publisher or an author by the cloud server 410, and the copyright owner can provide the content via the interface, and after the similarities are calculated, the content meeting the requirements of similarities is added into the electronic book; or the content approved (for example, the content approved by the cloud server 410) is added into the electronic book. In this way, a high-quality section of works can be offered by the copyright owner to be added into the electronic book. When the user browses the electronic book, benefits and potential profits can be brought to the copyright owner if the user is interested in the high-quality section of works which can stimulate the enthusiasm of user to buy works. Specifically, the publisher information or author information can be added into the electronic book, for example, contact info of the publisher or the author can be displayed in link in the electronic book, and the mobile terminal can be triggered to call service telephone by the user or a connection request can be initiated via the IM (Instant Messaging) client 420 when the user clicks the service telephone or the IM client in the contact info, so as to contact with the customer service staffs of the publisher to ask special purchasing issues.

The cloud server 410 is configured to save the electronic book after the electronic book is generated, and to assign a unique serial number PKN to the electronic book after the electronic book is generated, and thus the electronic book can be proofread, updated or referenced according to the unique serial number PKN. Specifically, a version number of the electronic book is changed but the unique serial number PKN of the electronic book is kept unchanged if the electronic book is updated. In other words, even if the content of the electronic book is updated, the unique serial number PKN is not changed, only the version number of the electronic book is changed. The corresponding electronic book can be found by the unique serial number PKN for reading, downloading, reviewing, referencing, etc.

The electronic book can be sent to a pre-specified client 420, a pre-specified network disk or a pre-specified mobile terminal by the cloud server 410. The cloud server 410 sends the electronic book to the pre-specified client 420 which is used by the user to send the query, i.e. assuming that the user sends the query to the cloud server 410 by a first client (for example, the smart phone), and then the cloud server 410 sends the electronic book to the first client after the electronic book is generated; or the cloud server 410 sends the electronic book to the client 420 which is used by the user to login in the cloud server 410, i.e. the electronic book is sent to a second client of the other type by the cloud server 410; or the electronic book is sent to the network disk of the user; or even the electronic book is sent to a user-specified device by the cloud server 410.

In addition, a means for providing the electronic book for the user by the cloud server 410 may be as follows: a read button or a download button for the electronic book on a search result page is provided by the cloud server 410 for the user to obtain the electronic book, in which the read button or the download button is in a form of a two-dimensional code or a link. Specifically, the read button or the download button of the electronic book can be provided for the user's terminal and the read button or the download button can be provided in the form of the link, and then the electronic book can be read or downloaded by clicking the link. Preferably, the read button or the download button of the electronic book can be provided in the form of the two-dimensional code which can be scanned by the user's terminal for reading or downloading. Of course, the read button or the download button of the electronic book may be in other forms, which are not enumerated herein.

After the electronic book is sent to the client 420, the position on the client 420 for displaying the electronic book can be varied, as long as the user can view the electronic book conveniently. For example, the read button or the download button can be placed at the top of the plurality of search results, or be placed in a prominent right position of the plurality of search results, or be placed in a prominent position in the middle of the plurality of search results, etc. For example, as shown in FIG. 6, after the user inputs the query "lagelangri", the corresponding electronic book may be displayed in a prominent right position of the plurality of search results responsive to the search of the "lagelangri", and then the user scans the two-dimensional code of the corresponding electronic book by the mobile terminal or other clients 420 and downloads the electronic book by the mobile terminal or other clients 420.

As long as an electronic book reader or an application with a similar function is installed, the user will be able to open the electronic book which is downloaded by the mobile terminal or other clients 420 at any time.

For the popular electronic book, for example, the cloud server 410 is configured to establish a community for a user reading or downloading the electronic book or to publish the electronic book, if an amount of downloads or readings of the electronic book is greater than a preset threshold. That is, if an amount of downloads or readings of the electronic book reaches a preset amount, a small community can be established by the cloud server 410 for the user reading or downloading the electronic book to communicate with each other, i.e. a post bar-style small community can be established by the cloud server 410 for the user reading or downloading the electronic book to communicate with each other. In addition, the popular electronic book can be published by the cloud server 410 if the amount of downloads or readings of the electronic book is greater than the preset threshold, i.e. the cloud server 410 can publish the popular electronic book. In the above example, the preset threshold may be, for example, 500.

Due to the rapid changing of internet information, internet information often grows explosively, so every week the electronic book can be updated periodically according to the search results corresponding to the query associated with the electronic book, and the version number of the electronic book can be changed but the unique serial number PKN of the electronic book can be kept unchanged after each update. The cloud server 410 sends an update notification to the user (for example, the user who downloads the electronic book) and pushes the updated electronic book if the electronic book is updated. Thus, the user can determine whether to download the electronic book, and if the user decides to download the electronic book, the cloud server 410 pushes the updated electronic book to the user.

There are some cases, for example, when some information can be changed by the copyright owner, such as modifying wrongly written characters, or adding a new page or deleting a page, etc., the version number of the electronic book cannot be changed, only the corresponding page can be changed, so the user traffic can be saved.

With the system for providing the electronic book according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met. After the cloud server generates the electronic book by aggregating the plurality of search results, a usage efficiency of the user can be improved, in which, after demo is measured, the usage efficiency brought by quick page turning can be increased by up to three times, and after processed by the professional typesetting software, the pages in the electronic book can be more beautiful, so an enthusiasm of the user for reading can be greatly increased. In addition, the biggest problem in the Internet is less high-quality content, and the content of the electronic book can integrate the content which is provided by the copyright owner such as the author or publisher, such that: on one hand, the laborious high-quality content can be incorporated into the Internet, on the other hand, the enthusiasm of the user for reading or buying printed works can be stimulated, so benefits can be brought to the copyright owner. The search in the mobile terminal and the PC are significantly different in the requirement, the advantages and the disadvantages. With the system for providing the electronic book according to embodiments of the present disclosure, the plurality of search results can be easily moved from the PC to the mobile terminal, and the user can be able to read the search results anytime, anywhere, and individual needs can be met, and the phone traffic can be saved. Further, information promotion can be carried out with the system, for example, the electronic book can be used as an excellent platform for inserting the promotion information, which can be similar to the beautiful illustrations in magazine and can be integrated with the content in the electronic book, so the user can accept the promotion information more easily and are unlikely to be disgusted with the promotion information compared to the promotion information inserted in the search result, and a huge space for displaying the promotion information can be provided.

Figure 8:
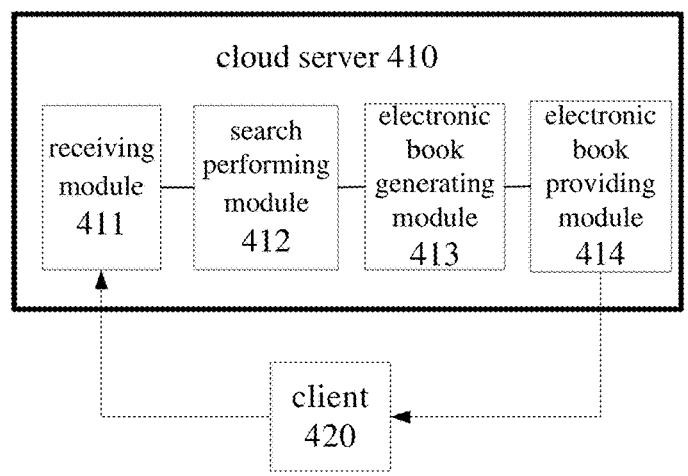
FIG. 8 is a schematic diagram of a cloud server according to an embodiment of the present disclosure.

FIG. 8 is a schematic diagram of a cloud server according to an embodiment of the present disclosure. As shown in FIG. 8, the cloud server 410 according to an embodiment of the present disclosure includes a receiving module 411, a search performing module 412 and an electronic book generating module 413.

The receiving module 411 is configured to receive a query. The search performing module 412 is configured to perform a search according to the query. The electronic book generating module 413 is configured to generate an electronic book according to a search result responsive to the search. In one embodiment, as shown in FIG. 8, the cloud server 410 can further include an electronic book providing module 414 which is configured to provide the electronic book for the user.

Specifically, the user can send the query to the receiving module 411 of the cloud server 410 by the client 420. The client 420 includes, but is not limited to, a smart phone, a tablet PC, a PC, etc. The search performing module 412 of the cloud server 410 has the search engine function, or gets help from the function of the conventional search engine, such as a Baidu search engine.

In one embodiment, the search performing module 412 is configured to perform the search according to the query to generate a plurality of search results. The electronic book generating module 413 is configured to aggregate the plurality of search results and to generate the electronic book. For example, the user sends the query "mobile phone" to the receiving module 411 by the client 420, and then the search performing module 412 performs the search on the Internet and/or Baidu cloud storage platform by the search engine function to obtain the plurality of search results corresponding to the query "mobile phone".

The electronic book generating module 413 is configured to aggregate the plurality of search results and to generate the electronic book, which specifically includes the following:

(1) A candidate search result is extracted from the plurality of search results.

(2) After the candidate search result is deduplicated and/or an irrelevant content is removed from the candidate search result, the candidate search result deduplicated and/or removed is merged and automatically typeset to generate the electronic book.

Specifically, extracting the candidate search result from the plurality of search results can be performed using a variety of methods, which include, but are not limited to, at least one of the following methods:

Method 1: according to first similarities between the plurality of search results and the query, the electronic book generating module 413 extracts the search result whose first similarity meets a preset first similarity request as the candidate search result. For example, the search result whose first similarity is first M1 first similarities is extracted as the candidate search result, in which M1 is a preset positive integer; or the search result whose first similarity meets a preset similarity threshold is extracted as the candidate search result. A calculation of similarities between the plurality of search results and the query can adopt a calculation of similarities between the plurality of search results and the query by the conventional search engines, for example, ranking based on semantic similarities.

Method 2: according to source authoritative statuses of the plurality of search results, the search result whose source authoritative status meets a preset request is extracted as the candidate search result. For example, some websites can be set to have higher authoritative statuses, such as some websites containing papers, some well-known websites, and websites belonging to the same operating company as the search engine, etc.

Method 3: according to a ranking result of the plurality of search results, first M search results are extracted as the candidate search result, in which M is a preset positive integer. In this case, aggregating is performed according to the ranking result of the plurality of search results in the search engine, for example, first 20 search results in the search engine are extracted as the candidate search result.

After the candidate search result is extracted from the plurality of search results, the candidate search result is deduplicated and/or an irrelevant content is removed from the candidate search result. After the candidate search result is deduplicated and/or an irrelevant content is removed from the candidate search result, the candidate search result deduplicated and/or removed is merged and automatically typeset to generate the electronic book. The deduplication refers to reserving one of candidate search results with the same content and removing the others. The irrelevant content refers to, for example, a navigation bar of a webpage, copyright information at the bottom of the webpage, etc. Of course, only a content of the webpage in a few preset positions can be extracted as the candidate search result, such as a title and a text of the webpage can be extracted. The above-described content of the webpage can be obtained from a snapshot which is formed from the webpage crawled by the search engine, or can be obtained based on the URL (Uniform Resource Locator) in real time.

In addition, the URL of the search result in the electronic book can be reserved. When the user downloads the electronic book to a mobile terminal (the client 420) and then clicks the URL corresponding to the search result in the electronic book, the webpage corresponding to the URL can be opened and browsed by a browser in the mobile terminal if the mobile terminal is in a networked status. Alternatively, when the user reads the electronic book online in the PC and then clicks the URL corresponding to the search result in the electronic book, the webpage corresponding to the URL can be opened and browsed by a browser in the PC.

In general, the above-described plurality of search results aggregated to generate the electronic book according to an embodiment of the present disclosure can include one of the URL, an abstract, a title, a cached content, a webpage content obtained in real time according to the URL and a combination thereof. The above-described plurality of search results even can include some editable or interactive modules, such as an application containing the plurality of search results implemented in Baidu box calculation, in which the plurality of search results can be directly displayed to the user and can be directly interacted with the user. Further, the application or a link of the application can be embedded in the electronic book. When the user reads the electronic book online or reads the electronic book after the electronic book is downloaded, the user can interact with the application by clicking the application or by clicking the link of the application.

Finally, the electronic book corresponding to the query can be generated after the corresponding plurality of search results are typeset automatically. An automatically typesetting program can be xelatex typesetting program which is an open source program, or can be such as a book typesetting program from Founder Group, InDesign typesetting program from Adobe and so on. A piece of typesetting information can be saved after the plurality of search results are typeset. For example, a piece of typesetting information can be called reverse reference syntax file in xelatex typesetting program, in which a typesetting source code can be retrieved by the reverse reference syntax file.

A format of the electronic book generated by typesetting can include, but are not limited to PDF, epub, mobi, etc. PDF supports a rearrangement of a pattern and a layout of the electronic book, which can be used as a preferred format. Epub can achieve re-typesetting automatically according to a resolution of a reader, but a concept of the page is lost, inconsistent results can be seen on a variety of carriers, and collaborative editing can become complicated, so epub can be used as a sub-optimal format. Of course, other formats can be used in the electronic book, which are not enumerated herein.

The plurality of search results can be distinguished in a variety of ways during typesetting, for example, the search results can be regarded as separate chapters, or the search results can be distinguished by separators. Specifically, in one embodiment, the cloud server 410 can further include a first obtaining module (not shown in the drawings) and a typesetting module (not shown in the drawings). The first obtaining module is configured to obtain a type of the client 420 (for example, the client used by the user). The typesetting module is configured to adjust a layout mode of the electronic book according to the type of the client 420 to suit each type of client 420 for browsing. Specifically, the first obtaining module obtains the type of the client 420, and then the typesetting module adjusts the layout mode of the electronic book according to the type of the client 420. In this embodiment, the electronic book can be generated automatically by the typesetting module by re-typesetting online according to the type of the client 420. For example, for two different types of clients 420, e.g., a smart phone and a tablet PC, the screen size of the smart phone is different from the screen size of the tablet PC, and thus the electronic book can be re-typeset online by the typesetting module according to the screen size to form different layout modes for suiting different types of clients 420, so as to ensure that each type of client 420 has a clear displaying for the electronic book.

In one embodiment, the cloud server 410 can further include a second obtaining module (not shown in the drawings) and a managing module (not shown in the drawings). Specifically, in order to safeguard a copyright of the electronic book, the second obtaining module is configured to obtain a piece of first copyright information of the plurality of search results and a piece of permission information of the user, and the managing module is configured to generate a piece of second copyright information of the electronic book according to the piece of first copyright information, and to manage an operation permission of the user for the electronic book according to the piece of permission information of the user. Specifically, the managing module stores the electronic book in the cloud server 410 as a mother book and generates a child book corresponding to the mother book according to the mother book and the type of the client 420, and the electronic book providing module 414 sends the electronic book to the client 420. The permission information can include a piece of page information of the mother book which is obtained by the client 420, for example, which can be obtained by user's login, i.e. the users can be divided into multiple levels, and different levels of users can have different levels of the permissions corresponding to different authorized scopes. In this way, after user's login, each user only can request the pages within the corresponding authorized scope, and cannot continuously request the text from the mother book (i.e. cannot request the text from the mother book for many times), otherwise the sense of safeguarding the copyright of the electronic book is lost.

In addition, the permission information also can include amount information of a content of the mother book which can be obtained by the client 420. For example, amount information of the content of the mother book obtained by the client 420 cannot exceed 50% of total amount information of the content of the mother book. Specifically, a request volume of all clients 420 for the protected content can be recorded by the cloud server 410. The corresponding client 420 can be locked if the request volume has exceeded a preset volume (such as 50%). When the client 420 is locked, only the search can be performed by the client 420 but the copy of the new page by the client 420 is limited. Thus, a safeguarding degree can be improved specifically.

In one embodiment, the child book includes a child information file and the child information file records a position of a page of a content in the child book in the mother book. The user-specified content can be obtained by the client 420 from the cloud server 410 according to the child information file of the child book. For example, an operation instruction (e.g., the operation instruction generated when the user performs a corresponding operation) is received by the client 420; a position of a content corresponding to the operation instruction in the mother book can be obtained by the client 420 according to the child information file, and the content corresponding to the operation instruction from the cloud server 410 can be obtained by the client 420 according to the position. The operation instruction may be, for example, an instruction for copying or editing the content in the child book. Specifically, the child information file can be generated by the cloud server 410 when the child book is generated according to the mother book. In particular, the child book may have one child information file, however, the child information files may be different due to different typesetting processes of the different child books. For example, for xelatex typesetting program, the child information file may be called the reverse reference syntax file, i.e. when the user clicks on PDF, the typesetting source code can be obtained by the reverse reference syntax file. The child information file records the position of pages of all texts and pictures of the child book in the mother book, which can be calculated by the x, y coordinate transformation. Therefore, the position of one page of the child book in the mother book can be obtained by the child information file. For example, after the operation instruction for copying contents of a certain page of the child book is obtained by the client 420, the contents in the mother book in the corresponding position can be sent to the client 420 according to the position of the contents of the certain page of the child book in the mother book, so a copy operation for the content can be achieved.

In order to enrich the content of the electronic book and to obtain information required by the user more easily, the electronic book generated by the described-above means can be expanded, i.e. a plurality of search results of a synonym or an expansion word corresponding to the query can be aggregated by the cloud server 410 into the electronic book, and the synonym or the expansion word corresponding to the query can be associated with the electronic book, and the electronic book can be associated with the synonym or the expansion word after the electronic book is expanded. The synonym refers to the word which has the same or similar meaning corresponding to the query in a search log, for example, when the user inputs the query "lagelangri", the plurality of search results corresponding to the query "lagelangri" can be aggregated into the electronic book, and the plurality of search results corresponding to the synonym "Lagrange" can also be aggregated into the electronic book. The expansion word refers to the word which is recommended to the user by the search engine after the user inputs the query into the search engine, and the expansion word is usually displayed to the user in a drop-down box in the search engine, or provided for the user in the related search terms, more simply, can be the relevant entry or recommended entry of the Encyclopedia. For example, when the user inputs the query "Lagrange" in the search engine, not only can the plurality of search results corresponding to "Lagrange" be aggregated into the electronic book by the cloud server 410, but also the plurality of search results corresponding to the expansion word "Lagrangian function" can be aggregated into the electronic book by the cloud server 410. Thus, the electronic book can be associated with the words "lagelangri", "Lagrangian", and "Lagrangian function". Whether other users inputs "lagelangri" or "Lagrange" or "Lagrangian function", the corresponding electronic book can be hit.

In addition to expanding, the cloud server 410 further includes an extending module (not shown in the drawings), in which the extending module is configured to check a content provided by a copyright owner and to add the content approved into the electronic book; or after calculating second similarities between the contents provided by the copyright owner and the query, to add the content provided by the copyright owner whose second similarity meets a preset second similarity request into the electronic book. Specifically, an interface can be supplied to the copyright owner such as a publisher or an author by the cloud server 410, and the copyright owner can provide the content via the interface, and after the similarities are calculated, the content meeting the requirements of similarities is added into the electronic book; or the content approved by the extending module of the cloud server 410 is added into the electronic book. In this way, a high-quality section of works can be offered by the copyright owner to be added into the electronic book. When the user browses the electronic book, benefits and potential profits can be brought to the copyright owner if the user is interested in the high-quality section of works which can stimulate the enthusiasm of user to buy works. Specifically, the publisher information or author information can be added into the electronic book, for example, contact info of the publisher or the author can be displayed in link in the electronic book, and the mobile terminal can be triggered to call service telephone by the user or a connection request can be initiated via the IM (Instant Messaging) client 420 when the user clicks the service telephone or the IM client in the contact info, so as to contact with the customer service staffs of the publisher to ask special purchasing issues.

In one embodiment, the cloud server 410 further includes an assigning module (not shown in the drawings). The assigning module is configured to save the electronic book, and to assign a unique serial number PKN to the electronic book after the electronic book is generated, and thus the electronic book can be proofread, updated or referenced according to the unique serial number PKN. Specifically, a version number of the electronic book can be changed by the assigning module but the unique serial number PKN of the electronic book can be kept unchanged by the assigning module if the electronic book is updated. In other words, even if the content of the electronic book is updated, the unique serial number PKN is not changed, only the version number of the electronic book is changed, so the corresponding electronic book can be found by the unique serial number PKN for reading, downloading, reviewing, referencing, etc.

The electronic book providing module 414 is further configured to send the electronic book to a pre-specified client 420, a pre-specified network disk or a pre-specified mobile terminal, or other devices specified by the user. For example, the electronic book providing module 414 sends the electronic book to the pre-specified client 420 which is used by the user to send the query, i.e. assuming that the user sends the query to the cloud server 410 by a first client (for example, the smart phone), and then the cloud server 410 sends the electronic book to the first client after the electronic book is generated; or the electronic book providing module 414 sends the electronic book to the client 420 which is used by the user to login in the cloud server 410, i.e. the electronic book is sent to a second client of the other type which is used by the user to login in the cloud server 410; or the electronic book is sent to the network disk of the user by the electronic book providing module 414; or even the electronic book is sent to a user-specified device by the electronic book providing module 414.

In addition, a means for providing the electronic book for the user by the electronic book providing module 414 may be as follows: a read button or a download button for the electronic book on a search result page is provided by the electronic book providing module 414, and thus the user can obtain the electronic book by the read button or the download button, in which the read button or the download button is in a form of a two-dimensional code or a link. Specifically, the read button or the download button of the electronic book can be provided for the user's terminal by the electronic book providing module 414 and the read button or the download button can be provided in the form of the link, and then the electronic book can be read or downloaded by clicking the link. Preferably, the read button or the download button of the electronic book can be provided in the form of the two-dimensional code which can be scanned by the user's terminal for reading or downloading. Of course, the read button or the download button of the electronic book may be in other forms, which are not enumerated herein.

After the electronic book is sent to the client 420, the position on the client 420 for displaying the electronic book can be varied, as long as the user can view the electronic book conveniently. For example, the read button or the download button can be placed at the top of the plurality of search results, or be placed in a prominent right position of the plurality of search results, or be placed in a prominent position in the middle of the plurality of search results, etc. For example, as shown in FIG. 6, after the user inputs the query "lagelangri", the corresponding electronic book may be displayed in a prominent right position of the plurality of search results responsive to the search of the "lagelangri", and then the user scans the two-dimensional code of the corresponding electronic book by the mobile terminal or other clients 420 and downloads the electronic book by the mobile terminal or other clients 420.

As long as an electronic book reader or an application with a similar function is installed, the user will be able to open the electronic book which is downloaded by the mobile terminal or other clients 420 at any time.

For the popular electronic book, for example, the cloud server 410 further includes a community establishing and publishing module (not shown in the drawings). The community establishing and publishing module is configured to establish a community for a user reading or downloading the electronic book or to publish the electronic book, if an amount of downloads or readings of the electronic book is greater than a preset threshold. That is, if an amount of downloads or readings of the electronic book reaches a preset amount, a small community can be established by the community establishing and publishing module for the user reading or downloading the electronic book to communicate with each other, i.e. a post bar-style small community can be established by the community establishing and publishing module for the user reading or downloading the electronic book to communicate with each other. In addition, the popular electronic book can be published by the community establishing and publishing module if the amount of downloads or readings of the electronic book is greater than the preset threshold, i.e. the community establishing and publishing module can publish the popular electronic book. In the above example, the preset threshold may be, for example, 500.

Due to the rapid changing of internet information, internet information often grows explosively, so every week the electronic book can be updated periodically according to the search results corresponding to the query associated with the electronic book, and the version number of the electronic book can be changed but the unique serial number PKN of the electronic book can be kept unchanged after each update. In one embodiment, the cloud server 410 further includes an updating module (not shown in the drawings), in which the updating module sends an update notification to the user (for example, the user who downloads the electronic book) and pushes the updated electronic book if the electronic book is updated. Thus, the user can determine whether to download the electronic book, and if the user decides to download the electronic book, the updating module pushes the updated electronic book to the user.

There are some cases, for example, when some information can be changed by the copyright owner, such as modifying wrongly written characters, or adding a new page or deleting a page, etc., the version number of the electronic book cannot be changed, only the corresponding page can be changed, so the user traffic can be saved.

With the cloud server according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met. After the cloud server generates the electronic book by aggregating the plurality of search results, a usage efficiency of the user can be improved, in which after demo is measured, the usage efficiency brought by quick page turning can be increased by up to three times, and after processed by the professional typesetting software, the pages in the electronic book can be more beautiful, so an enthusiasm of the user for reading can be greatly increased. In addition, the biggest problem in the Internet is less high-quality content, and the content of the electronic book can integrate the content which is provided by the copyright owner such as the author or publisher, such that: on one hand, the laborious high-quality content can be incorporated into the Internet, on the other hand, the enthusiasm of the user for reading or buying printed works can be stimulated, so benefits can be brought to the copyright owner. The search in the mobile terminal and the PC are significantly different in the requirement, the advantages and the disadvantages. With the cloud server according to embodiments of the present disclosure, the plurality of search results can be easily moved from the PC to the mobile terminal, and the user can be able to read the search results anytime, anywhere, and individual needs can be met, and the phone traffic can be saved. Further, information promotion can be carried out with the cloud server, for example, the electronic book can be used as an excellent platform for inserting the promotion information, which can be similar to the beautiful illustrations in magazine and can be integrated with the content in the electronic book, so the user can accept the promotion information more easily and are unlikely to be disgusted with the promotion information compared to the promotion information inserted in the search result, and a huge space for displaying the promotion information can be provided.

Figure 9:
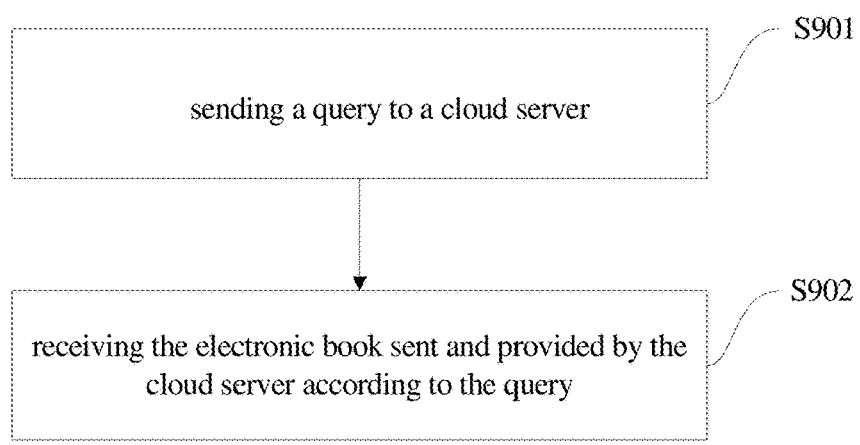
FIG. 9 is a flow chart of a method for providing an electronic book according to another embodiment of the present disclosure.

FIG. 9 is a flow chart of a method for providing an electronic book according to another embodiment of the present disclosure. As shown in FIG. 9, the method includes following steps.

At step S901, a query is sent to a cloud server. Specifically, the query can be sent to the cloud server by a search webpage of a client. The client includes, but is not limited to, a smart phone, a tablet PC, a PC, etc.

At step S902, the electronic book sent and provided by the cloud server according to the query is received. Specifically, in one embodiment, the cloud server can generate a plurality of search results responsive to the search to generate the electronic book, which specifically includes following steps:

At step 1, a search is performed according to the query to generate the plurality of search results. For example, the user sends the query "mobile phone" to the cloud server by the first client, and then the cloud server performs the search on the Internet and/or Baidu cloud storage platform by a search engine function to obtain the plurality of search results corresponding to the query "mobile phone".

At step 2, the electronic book is generated by aggregating the plurality of search results. In one embodiment, the cloud server aggregates the plurality of search results and generates the electronic book, which specifically includes following steps:

(1) A candidate search result is extracted from the plurality of search results.

(2) After the candidate search result is deduplicated and/or an irrelevant content is removed from the candidate search result, the candidate search result deduplicated and/or removed is merged and automatically typeset to generate the electronic book.

Specifically, extracting the candidate search result from the plurality of search results can be performed using a variety of methods, which include, but are not limited to, at least one of the following methods:

Method 1: according to first similarities between the plurality of search results and the query, the search result whose first similarity meets a preset first similarity request is extracted as the candidate search result. For example, the search result whose first similarity is first M1 first similarities is extracted as the candidate search result, in which M1 is a preset positive integer; or the search result whose first similarity meets a preset similarity threshold is extracted as the candidate search result. A calculation of similarities between the plurality of search results and the query can adopt a calculation of similarities between the plurality of search results and the query by the conventional search engines, for example, ranking based on semantic similarities.

Method 2: according to source authoritative statuses of the plurality of search results, the search result whose source authoritative status meets a preset request is extracted as the candidate search result. For example, some websites can be set to have higher authoritative statuses, such as some websites containing papers, some well-known websites, and websites belonging to the same operating company as the search engine, etc.

Method 3: according to a ranking result of the plurality of search results, first M search results are extracted as the candidate search result, in which M is a preset positive integer. In this case, aggregating is performed according to the ranking result of the plurality of search results in the search engine, for example, first 20 search results in the search engine are extracted as the candidate search result.

After the candidate search result is extracted from the plurality of search results, the candidate search result is deduplicated by the cloud client and/or an irrelevant content is removed from the candidate search result by the cloud client. After the candidate search result is deduplicated and/or an irrelevant content is removed from the candidate search result, the candidate search result deduplicated and/or removed is merged and automatically typeset to generate the electronic book. The deduplication refers to reserving one of candidate search results with the same content and removing the others. The irrelevant content refers to, for example, a navigation bar of a webpage, copyright information at the bottom of the webpage, etc. Of course, only a content of the webpage in a few preset positions can be extracted as the candidate search result, such as a title and a text of the webpage can be extracted. The above-described content of the webpage can be obtained from a snapshot which is formed from the webpage crawled by the search engine, or can be obtained based on the URL (Uniform Resource Locator) in real time.

In addition, the URL of the search result in the electronic book can be reserved. When the user downloads the electronic book to a mobile terminal and then clicks the URL corresponding to the search result in the electronic book, the webpage corresponding to the URL can be opened and browsed by a browser in the mobile terminal if the mobile terminal is in a networked status. Alternatively, when the user reads the electronic book online in the PC and then clicks the URL corresponding to the search result in the electronic book, the webpage corresponding to the URL can be opened and browsed by a browser in the PC.

In general, the above-described plurality of search results aggregated to generate the electronic book according to an embodiment of the present disclosure can include one of the URL, an abstract, a title, a cached content, a webpage content obtained in real time according to the URL and a combination thereof. The above-described plurality of search results even can include some editable or interactive modules, such as an application containing the plurality of search results implemented in Baidu box calculation, in which the plurality of search results can be directly displayed to the user and can be directly interacted with the user. Further, the application or a link of the application can be embedded in the electronic book. When the user reads the electronic book online or reads the electronic book after the electronic book is downloaded, the user can interact with the application by clicking the application or by clicking the link of the application.

Finally, the electronic book corresponding to the query can be generated after the corresponding plurality of search results are typeset automatically. An automatically typesetting program can be xelatex typesetting program which is an open source program, or can be such as a book typesetting program from Founder Group, InDesign typesetting program from Adobe and so on. A piece of typesetting information can be saved after the plurality of search results are typeset. For example, a piece of typesetting information can be called reverse reference syntax file in xelatex typesetting program, in which a typesetting source code can be retrieved by the reverse reference syntax file.

A format of the electronic book generated by typesetting can include, but are not limited to PDF, epub, mobi, etc. PDF supports a rearrangement of a pattern and a layout of the electronic book, which can be used as a preferred format. Epub can achieve re-typesetting automatically according to a resolution of a reader, but a concept of the page is lost, inconsistent results can be seen on a variety of carriers, and collaborative editing can become complicated, so epub can be used as a sub-optimal format. Of course, other formats can be used in the electronic book, which are not enumerated herein.

The plurality of search results can be distinguished in a variety of ways during typesetting, for example, the search results can be regarded as separate chapters, or the search results can be distinguished by separators. Specifically, the electronic book can be typeset by the cloud server according to a type of the client to suit each type of client for browsing. More specifically, the type of the client used by the user can be obtained by the cloud server and a layout mode of the electronic book can be adjusted according to the type of the client by the cloud server. In this embodiment, the electronic book can be generated automatically by re-typesetting online according to the type of the client. For example, the type of the smart phone is different from the type of the tablet PC, and the screen size of the smart phone is different from the screen size of the tablet PC, and thus the electronic book can be re-typeset online according to the screen size to form different layout modes for suiting different types of clients, so as to ensure that each type of client has a clear displaying for the electronic book.

In order to safeguard a copyright of the electronic book, the method according to an embodiment of the present disclosure further includes following steps: a piece of first copyright information of the plurality of search results and a piece of permission information of the user are obtained by the cloud server; and a piece of second copyright information of the electronic book is generated by the cloud server according to the piece of first copyright information, and an operation permission of the user for the electronic book is managed by the cloud server according to the piece of permission information of the user. Specifically, managing the operation permission of the user for the electronic book according to the piece of permission information of the user may include following steps: the electronic book is stored in the cloud server as a mother book; a child book corresponding to the mother book is generated according to the mother book and the type of the client, and sent to the client. The permission information can include a piece of page information of the mother book which is obtained by the client, for example, which can be obtained by user's login, i.e. the users can be divided into multiple levels, and different levels of users can have different levels of the permissions corresponding to different authorized scopes. In this way, after user's login, each user only can request the pages within the corresponding authorized scope, and cannot continuously request the text from the mother book (i.e. cannot request the text from the mother book for many times), otherwise the sense of safeguarding the copyright of the electronic book is lost.

In addition, the permission information also can include amount information of a content of the mother book obtained by the client. For example, amount information of the content of the mother book obtained by the client cannot exceed 50% of total amount information of the content of the mother book. Specifically, a request volume of all clients for the protected content can be recorded by the cloud server. The corresponding client can be locked if the request volume has exceeded a preset volume (such as 50%). When the client is locked, only the search can be performed by the user but the copy of the new page is limited. Thus, a safeguarding degree can be improved specifically.

In one embodiment, the child book includes a child information file and the child information file records a position of a page of a content in the child book in the mother book. The user-specified content can be obtained by the client from the cloud server according to the child information file of the child book. For example, an operation instruction (e.g., the operation instruction generated when the user performs a corresponding operation) is received by the client; a position of a content corresponding to the operation instruction in the mother book can be obtained by the client according to the child information file, and the content corresponding to the operation instruction from the cloud server can be obtained by the client according to the position. The operation instruction may be, for example, an instruction for copying or editing the content in the child book. Specifically, the child information file can be generated by the cloud server when the child book is generated according to the mother book. In particular, the child book may have one child information file, however, the child information files may be different due to different typesetting processes of the different child books. For example, for xelatex typesetting program, the child information file may be called the reverse reference syntax file, i.e. when the user clicks on PDF, the typesetting source code can be obtained by the reverse reference syntax file. The child information file records the position of pages of all texts and pictures of the child book in the mother book, which can be calculated by the x, y coordinate transformation. Therefore, the position of one page of the child book in the mother book can be obtained by the child information file. For example, after the operation instruction for copying contents of a certain page of the child book by the user via the client is obtained, the contents in the mother book in the corresponding position can be sent to the client according to the position of the contents of the certain page of the child book in the mother book, so a copy operation for the content can be achieved.

In order to enrich the content of the electronic book and to obtain information required by the user more easily, the electronic book generated by the described-above means can be expanded, i.e. a plurality of search results of a synonym or an expansion word corresponding to the query can be aggregated in the electronic book by the cloud server, and the synonym or the expansion word corresponding to the query can be associated with the electronic book, and the electronic book can be associated with the synonym or the expansion word after the electronic book is expanded. The synonym refers to the word which has the same or similar meaning corresponding to the query in a search log, for example, when the user inputs the query "lagelangri", the plurality of search results corresponding to the query "lage-langri" can be aggregated into the electronic book by the cloud server, and the plurality of search results corresponding to the synonym "Lagrange" can also be aggregated into the electronic book by the cloud server. The expansion word refers to the word which is recommended to the user by the search engine after the user inputs the query into the search engine, and the expansion word is usually displayed to the user in a drop-down box in the search engine, or provided for the user in the related search terms, more simply, can be the relevant entry or recommended entry of the Encyclopedia. For example, when the user inputs the query "Lagrange" in the search engine, not only can the plurality of search results corresponding to "Lagrange" be aggregated into the electronic book by the cloud server, but also the plurality of search results corresponding to the expansion word "Lagrangian function" can be aggregated into the electronic book by the cloud server. Thus, the electronic book can be associated with the words "lagelangri", "Lagrangian", and "Lagrangian function". Whether other users inputs "lagelangri" or "Lagrange" or "Lagrangian function", the corresponding electronic book can be hit.

In addition to expanding, the methods further includes the following step: a content provided by a copyright owner is checked by the cloud server and the content approved is added into the electronic book by the cloud server; or after calculating second similarities between the contents provided by the copyright owner and the query, the content provided by the copyright owner whose second similarity meets a preset second similarity request is added into the electronic book by the cloud server. Specifically, an interface can be supplied by the cloud server to the copyright owner such as a publisher or an author, and the copyright owner can provide the content via the interface, and after the similarities are calculated, the content meeting the requirements of similarities is added into the electronic book by the cloud server; or the content approved (e.g., the content approved by the cloud client) is added into the electronic book by the cloud server. In this way, a high-quality section of works can be offered by the copyright owner to be added into the electronic book. When the user browses the electronic book, benefits and potential profits can be brought to the copyright owner if the user is interested in the high-quality section of works which can stimulate the enthusiasm of user to buy works. Specifically, the publisher information or author information can be added into the electronic book by the cloud server, for example, contact info of the publisher or the author can be displayed in link in the electronic book, and the mobile terminal can be triggered to call service telephone by the user or a connection request can be initiated via the IM (Instant Messaging) client when the user clicks the service telephone or the IM client in the contact info, so as to contact with the customer service staffs of the publisher to ask special purchasing issues.

The electronic book can be saved by the cloud server after the electronic book is generated, and a unique serial number PKN can be assigned to the electronic book by the cloud server after the electronic book is generated. Thus, the electronic book can be proofread, updated or referenced according to the unique serial number PKN. Specifically, a version number of the electronic book can be changed but the unique serial number PKN of the electronic book can be kept unchanged by the cloud server if the electronic book is updated. In other words, even if the content of the electronic book is updated, the unique serial number PKN is not changed, only the version number of the electronic book is changed. The corresponding electronic book can be found by the unique serial number PKN for reading, downloading, reviewing, referencing, etc.

At step 3, the electronic book is provided for the user.

Specifically, the electronic book is provided for the user as the search result. For example, the search can be performed after the user inputs the query into the search engine by a search webpage in the client, the electronic book generated according to the plurality of search results can be displayed to the user as the search result in the search webpage of the client. As one example, as shown in FIG. 3, the user inputs the query "shishichuanshuo" in a search page, and the first search result which is displayed in first page of the plurality of search results is the electronic book corresponding to "shishichuanshuo" (i.e. micro-book). As another example, as shown in FIG. 4, the user inputs the query "hafodaxue" in a search page, and the first search result which is displayed in first page of the plurality of search results is the electronic book corresponding to "hafodaxue" (i.e. micro-book), the user can click the "micro-book" icon to obtain the electronic book corresponding to "hafodaxue".

Of course, the electronic book can be provided by the cloud server for the user in other ways. For example, the cloud server sends the electronic book to a pre-specified client, a pre-specified network disk or a pre-specified mobile terminal, or other pre-specified devices. Specifically, the cloud server sends the electronic book to the client which is used by the user to send the query, i.e. assuming that the user sends the query to the cloud server by a first client, and then the cloud server sends the electronic book to the first client after the electronic book is generated; or the cloud server sends the electronic book to the client which is used by the user to login in the cloud server, i.e. the electronic book is sent to a second client of other types; or the electronic book is sent to the network disk of the user by the cloud server; or even the electronic book is sent to a user-specified device by the cloud server.

In addition, a means which is used by the cloud server for providing the electronic book for the user may be as follows: a read button or a download button for the electronic book on a search result page is provided, and then the user can obtain the electronic book by the read button or the download button, in which the read button or the download button is in a form of a two-dimensional code or a link. Specifically, the read button or the download button of the electronic book can be provided for the user's terminal and the read button or the download button can be provided in the form of the link, and then the electronic book can be read or downloaded by clicking the link. Preferably, the read button or the download button can be provided in the form of the two-dimensional code which can be scanned by the user's terminal for reading or downloading the electronic book. Of course, the read button or the download button may be in other forms, which are not enumerated herein.

After the electronic book is sent to the client, the position in the client for displaying the electronic book can be varied, as long as the user can view the electronic book conveniently. For example, the read button or the download button can be placed at the top of the plurality of search results, or be placed in a prominent right position of the plurality of search results, or be placed in a prominent position in the middle of the plurality of search results, etc. For example, as shown in FIG. 5, the user inputs the query "hafodaxue", the corresponding electronic book may be displayed at the top of the plurality of search results responsive to the search of the "hafodaxue", and the user scans the two-dimensional code of the corresponding electronic book by the mobile terminal or other clients and downloads the electronic book by the mobile terminal or other clients. Moreover, as shown in FIG. 6, the user inputs the query "lagelangri", the corresponding electronic book may be displayed in a prominent right position of the plurality of search results responsive to the search of the "lagelangri", and the user scans the two-dimensional code of the corresponding electronic book by the mobile terminal or other clients and downloads the electronic book by the mobile terminal or other clients.

As long as the electronic book reader or an application with a similar function is installed, the user will be able to open the electronic book which is downloaded by the mobile terminal or other clients at any time.

For the popular electronic book, for example, a community is established by the cloud server for a user reading or downloading the electronic book or the electronic book is published by the cloud server, if an amount of downloads or readings of the electronic book is greater than a preset threshold. That is, if an amount of downloads or readings of the electronic book reaches a preset amount, a small community can be established by the cloud server for the user reading or downloading the electronic book to communicate with each other, i.e. a post bar-style small community can be established by the cloud server for the user reading or downloading the electronic book to communicate with each other. In addition, the popular electronic book can be published if the amount of downloads or readings of the electronic book is greater than the preset threshold, i.e. the cloud server can publish the popular electronic book. In the above example, the preset threshold may be, for example, 500.

Due to the rapid changing of internet information, internet information often grows explosively, so every week the electronic book can be updated periodically according to the search results corresponding to the query associated with the electronic book, and the version number of the electronic book can be changed but the unique serial number PKN of the electronic book can be kept unchanged after each update. An update notification is sent to the user by the cloud server and the update electronic book is pushed to the user by the cloud server if the electronic book is updated. Thus, the user can determine whether to download the electronic book, and if the user decides to download the electronic book, the cloud server pushes the updated electronic book to the user. The updated electronic book can be sent to the client of the user and then supplied to the user in the form of the two-dimensional code or the link, so the user can scan the two-dimensional code by the terminal (client) to download or read the electronic book. As shown in FIG. 5, when the electronic book corresponding to the "hafodaxue" is updated, the electronic book i.e. micro-book [three updates] "hafodaxue": PKN-BD-01-0001 can be displayed, and then the user scans the two-dimensional code by the client such as the mobile terminal and can download the updated electronic book in the mobile terminal.

There are some cases, for example, when some information can be changed by the copyright owner, such as modifying wrongly written characters, or adding a new page or deleting a page, etc., the version number of the electronic book cannot be changed, only the corresponding page can be changed, so the user traffic can be saved.

With the method for providing the electronic book according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met. After the cloud server generates the electronic book by aggregating the plurality of search results, a usage efficiency of the user can be improved, in which, after demo is measured, the usage efficiency brought by quick page turning can be increased by up to three times, and after processed by the professional typesetting software, the pages in the electronic book can be more beautiful, so an enthusiasm of the user for reading can be greatly increased. In addition, the biggest problem in the Internet is less high-quality content, and the content of the electronic book can integrate the content which is provided by the copyright owner such as the author or publisher, such that: on one hand, the laborious high-quality content can be incorporated into the Internet, on the other hand, the enthusiasm of the user for reading or buying printed works can be stimulated, so benefits can be brought to the copyright owner. The search in the mobile terminal and the PC are significantly different in the requirement, the advantages and the disadvantages. With the method for providing the electronic book according to embodiments of the present disclosure, the plurality of search results can be easily moved from the PC to the mobile terminal, and the user can be able to read the search results anytime, anywhere, and individual needs can be met, and the phone traffic can be saved. Further, information promotion can be carried out with the method, for example, the electronic book can be used as an excellent platform for inserting the promotion information, which can be similar to the beautiful illustrations in magazine and can be integrated with the content in the electronic book, so the user can accept the promotion information more easily and are unlikely to be disgusted with the promotion information compared to the promotion information inserted in the search result, and a huge space for displaying the promotion information can be provided.

Another system for providing an electronic book according to an embodiment of the present disclosure is provided. The system includes a cloud server, in which the cloud server is configured to receive a query, to perform a search according to the query, and to generate the electronic book according to a search result responsive to the search. The cloud server is a server having a search engine function itself, or getting help from the conventional search engine, such as a Baidu search engine.

In one embodiment, the system further includes a first client, in which the first client is configured to receive the query input by a user and to send the query to the cloud server. Specifically, the first client is further configured to receive the electronic book provided by the cloud server.

In addition, the system further includes a second client, in which the second client is configured to receive the electronic book provided by the cloud server. The first client and the second client may be the same or different, that is, no matter which client can be used by the user to perform the search, the cloud server can provide the electronic book to either the first client or the second client. Specifically, the cloud server provides the electronic book as the search result to the first client or the second client. The first client and the second client include, but are not limited to, a smart phone, a tablet PC and a PC, etc.

In one embodiment, the cloud server perform a search to the query to generate the plurality of search results, and aggregates the plurality of search results and generates the electronic book, and provides the electronic book to the user. For example, the user sends the query "mobile phone" to the cloud server by the client, and then the cloud server performs the search on the Internet and/or Baidu cloud storage platform by the search engine function to obtain the plurality of search results corresponding to the query "mobile phone".

In one embodiment, the cloud server aggregates the plurality of search results and generates the electronic book, which specifically includes steps:

(1) A candidate search result is extracted from the plurality of search results.

(2) After the candidate search result is deduplicated and/or an irrelevant content is removed from the candidate search result, the candidate search result deduplicated and/or removed is merged and automatically typeset to generate the electronic book.

Specifically, extracting the candidate search result from the plurality of search results can be performed using a variety of methods, which include, but are not limited to, at least one of the following methods:

Method 1: according to first similarities between the plurality of search results and the query, the search result whose first similarity meets a preset first similarity request is extracted as the candidate search result. For example, the search result whose first similarity is first M1 first similarities is extracted as the candidate search result, in which M1 is a preset positive integer; or the search result whose first similarity meets a preset similarity threshold is extracted as the candidate search result. A calculation of similarities between the plurality of search results and the query can adopt a calculation of similarities between the plurality of search results and the query by the conventional search engines, for example, ranking based on semantic similarities.

Method 2: according to source authoritative statuses of the plurality of search results, the search result whose source authoritative status meets a preset request is extracted as the candidate search result. For example, some websites can be set to have higher authoritative statuses, such as some websites containing papers, some well-known websites, and websites belonging to the same operating company as the search engine, etc.

Method 3: according to a ranking result of the plurality of search results, first M search results are extracted as the candidate search result, in which M is a preset positive integer. In this case, aggregating is performed according to the ranking result of the plurality of search results in the search engine, for example, first 20 search results in the search engine are extracted as the candidate search result.

After the candidate search result is extracted from the plurality of search results, the candidate search result is deduplicated by the cloud client and/or an irrelevant content is removed from the candidate search result by the cloud client. After the candidate search result is deduplicated and/or an irrelevant content is removed from the candidate search result, the candidate search result deduplicated and/or removed is merged and automatically typeset to generate the electronic book. The deduplication refers to reserving one of candidate search results with the same content and removing the others. The irrelevant content refers to, for example, a navigation bar of a webpage, copyright information at the bottom of the webpage, etc. Of course, only a content of the webpage in a few preset positions can be extracted as the candidate search result, such as a title and a text of the webpage can be extracted. The above-described content of the webpage can be obtained from a snapshot which is formed from the webpage crawled by the search engine, or can be obtained based on the URL (Uniform Resource Locator) in real time.

In addition, the URL of the search result in the electronic book can be reserved. When the user downloads the electronic book to a mobile terminal (the client) and then clicks the URL corresponding to the search result in the electronic book, the webpage corresponding to the URL can be opened and browsed by a browser in the mobile terminal if the mobile terminal is in a networked status. Alternatively, when the user reads the electronic book online in the PC and then clicks the URL corresponding to the search result in the electronic book, the webpage corresponding to the URL can be opened and browsed by a browser in the PC.

In general, the above-described plurality of search results aggregated to generate the electronic book according to an embodiment of the present disclosure can include one of the URL, an abstract, a title, a cached content, a webpage content obtained in real time according to the URL and a combination thereof. The above-described plurality of search results even can include some editable or interactive modules, such as an application containing the plurality of search results implemented in Baidu box calculation, in which the plurality of search results can be directly displayed to the user and can be directly interacted with the user. Further, the application or a link of the application can be embedded in the electronic book. When the user reads the electronic book online or reads the electronic book after the electronic book is downloaded, the user can interact with the application by clicking the application or by clicking the link of the application.

Finally, the electronic book corresponding to the query can be generated after the corresponding plurality of search results are typeset automatically. An automatically typesetting program can be xelatex typesetting program which is an open source program, or can be such as a book typesetting program from Founder Group, InDesign typesetting program from Adobe and so on. A piece of typesetting information can be saved after the plurality of search results are typeset. For example, a piece of typesetting information can be called reverse reference syntax file in xelatex typesetting program, in which a typesetting source code can be retrieved by the reverse reference syntax file.

A format of the electronic book generated by typesetting can include, but are not limited to PDF, epub, mobi, etc. PDF supports a rearrangement of a pattern and a layout of the electronic book, which can be used as a preferred format. Epub can achieve re-typesetting automatically according to a resolution of a reader, but a concept of the page is lost, inconsistent results can be seen on a variety of carriers, and collaborative editing can become complicated, so epub can be used as a sub-optimal format. Of course, other formats can be used in the electronic book, which are not enumerated herein.

The plurality of search results can be distinguished in a variety of ways during typesetting, for example, the search results can be regarded as separate chapters, or the search results can be distinguished by separators. Specifically, the electronic book can be typeset by the cloud server according to a type of the client to suit each type of client for browsing. More specifically, the type of the client (e.g., the client used by the user) can be obtained by the cloud server and a layout mode of the electronic book can be adjusted according to the type of the client by the cloud server. In this embodiment, the electronic book can be generated automatically by re-typesetting online according to the type of the client. For example, the type of the smart phone is different from the type of the tablet PC, and the screen size of the smart phone is different from the screen size of the tablet PC, and thus the electronic book can be re-typeset online according to the screen size to form different layout modes for suiting different types of clients, so as to ensure that each type of client has a clear displaying for the electronic book.

In order to safeguard a copyright of the electronic book, a piece of first copyright information of the plurality of search results and a piece of permission information of the user are obtained by the cloud server; and a piece of second copyright information of the electronic book is generated by the cloud server according to the piece of first copyright information, and an operation permission of the user for the electronic book is managed by the cloud server according to the piece of permission information of the user. Specifically, managing the operation permission of the user for the electronic book according to the piece of permission information of the user may include the following steps: the electronic book is stored in the cloud server as a mother book; a child book corresponding to the mother book is generated according to the mother book and the type of the client, and sent to the client. The permission information can include a piece of page information of the mother book which is obtained by the client, for example, which can be obtained by user's login, i.e. the users can be divided into multiple levels, and different levels of users can have different levels of the permissions corresponding to different authorized scopes. In this way, after user's login, each user only can request the pages within the corresponding authorized scope, and cannot continuously request the text from the mother book (i.e. cannot request the text from the mother book for many times), otherwise the sense of safeguarding the copyright of the electronic book is lost.

In addition, the permission information also can include amount information of a content of the mother book obtained by the client. For example, amount information of the content of the mother book obtained by the client cannot exceed 50% of total amount information of the content of the mother book. Specifically, a request volume of all clients for the protected content can be recorded by the cloud server. The corresponding client can be locked if the request volume has exceeded a preset volume (such as 50%). When the client is locked, only the search can be performed by the user but the copy of the new page by the client is limited. Thus, a safeguarding degree can be improved specifically.

In one embodiment, the child book includes a child information file and the child information file records a position of a page of a content in the child book in the mother book. The user-specified content can be obtained by the client from the cloud server according to the child information file of the child book. For example, an operation instruction (e.g., the operation instruction generated when the user performs a corresponding operation) is received by the client; a position of a content corresponding to the operation instruction in the mother book can be obtained by the client according to the child information file, and the content corresponding to the operation instruction from the cloud server can be obtained by the client according to the position. The operation instruction may be, for example, an instruction for copying or editing the content in the child book. Specifically, the child information file can be generated by the cloud server when the child book is generated according to the mother book. In particular, the child book may have one child information file, however, the child information files may be different due to different typesetting processes of the different child books. For example, for xelatex typesetting program, the child information file may be called the reverse reference syntax file, i.e. when the user clicks on PDF, the typesetting source code can be obtained by the reverse reference syntax file. The child information file records the position of pages of all texts and pictures of the child book in the mother book, which can be calculated by the x, y coordinate transformation. Therefore, the position of one page of the child book in the mother book can be obtained by the child information file. For example, after the operation instruction for copying contents of a certain page of the child book is obtained by the cloud client, the contents in the mother book in the corresponding position can be sent to the client according to the position of the contents of the certain page of the child book in the mother book, so a copy operation for the content can be achieved.

In order to enrich the content of the electronic book and to obtain information required by the user more easily, the electronic book generated by the described-above means can be expanded, i.e. a plurality of search results of a synonym or an expansion word corresponding to the query can be aggregated in the electronic book by the cloud server, and the synonym or the expansion word corresponding to the query can be associated with the electronic book, and the electronic book can be associated with the synonym or the expansion word after the electronic book is expanded. The synonym refers to the word which has the same or similar meaning corresponding to the query in a search log, for example, when the user inputs the query "lagelangri", the plurality of search results corresponding to the query "lagelangri" can be aggregated into the electronic book by the cloud server, and the plurality of search results corresponding to the synonym "Lagrange" can also be aggregated into the electronic book by the cloud server. The expansion word refers to the word which is recommended to the user by the search engine after the user inputs the query into the search engine, and the expansion word is usually displayed to the user in a drop-down box in the search engine, or provided for the user in the related search terms, more simply, can be the relevant entry or recommended entry of the Encyclopedia. For example, when the user inputs the query "Lagrange" in the search engine, not only can the plurality of search results corresponding to "Lagrange" be aggregated into the electronic book by the cloud server, but also the plurality of search results corresponding to the expansion word "Lagrangian function" can be aggregated into the electronic book by the cloud server. Thus, the electronic book can be associated with the words "lagelangri", "Lagrangian", and "Lagrangian function". Whether other users inputs "lagelangri" or "Lagrange" or "Lagrangian function", the corresponding electronic book can be hit.

In addition to expanding, a content provided by a copyright owner is checked by the cloud server and the content approved is added into the electronic book by the cloud server; or after calculating second similarities between the contents provided by the copyright owner and the query, the content provided by the copyright owner whose second similarity meets a preset second similarity request is added into the electronic book by the cloud server. Specifically, an interface can be supplied by the cloud server to the copyright owner such as a publisher or an author, and the copyright owner can provide the content via the interface, and after the similarities are calculated, the content meeting the requirements of similarities is added into the electronic book by the cloud server; or the content approved is added into the electronic book by the cloud server. In this way, a high-quality section of works can be offered by the copyright owner to be added into the electronic book. When the user browses the electronic book, benefits and potential profits can be brought to the copyright owner if the user is interested in the high-quality section of works which can stimulate the enthusiasm of user to buy works. Specifically, the publisher information or author information can be added into the electronic book by the cloud server, for example, contact info of the publisher or the author can be displayed in link in the electronic book, and the mobile terminal can be triggered to call service telephone by the user or a connection request can be initiated via the IM (Instant Messaging) client when the user clicks the service telephone or the IM client in the contact info, so as to contact with the customer service staffs of the publisher to ask special purchasing issues.

The electronic book can be saved by the cloud server after the electronic book is generated, and a unique serial number PKN can be assigned to the electronic book by the cloud server after the electronic book is generated, and thus the electronic book can be proofread, updated or referenced according to the unique serial number PKN. Specifically, a version number of the electronic book can be changed but the unique serial number PKN of the electronic book can be kept unchanged by the cloud server if the electronic book is updated. In other words, even if the content of the electronic book is updated, the unique serial number PKN is not changed, only the version number of the electronic book is changed. The corresponding electronic book can be found by the unique serial number PKN for reading, downloading, reviewing, referencing, etc.

The cloud server sends the electronic book to a pre-specified client, a pre-specified network disk or a pre-specified mobile terminal, or other pre-specified devices. Specifically, the cloud server sends the electronic book to the client which is used by the user to send the query, i.e. assuming that the user sends the query to the cloud server by a first client (e.g., a smart phone), and then the cloud server sends the electronic book to the first client after the electronic book is generated; or the cloud server sends the electronic book to the client which is used by the user to login in the cloud server, i.e. the electronic book is sent to a second client (e.g., a PC, a tablet PC, etc.) of the other type; or the electronic book is sent to the network disk of the user by the cloud server; or even the electronic book is sent to a user-specified device by the cloud server.

In addition, a means which is used by the cloud server for providing the electronic book for the user may be as follows: a read button or a download button for the electronic book on a search result page is provided, and then the user can obtain the electronic book by the read button or the download button, in which the read button or the download button is in a form of a two-dimensional code or a link. Specifically, the read button or the download button of the electronic book can be provided for the user's terminal and the read button or the download button can be provided in the form of the link, and then the electronic book can be read or downloaded by clicking the link. Preferably, the read button or the download button can be provided in the form of the two-dimensional code which can be scanned by the user's terminal for reading or downloading. Of course, the read button or the download button may be in other forms, which are not enumerated herein.

After the electronic book is sent to the client, the position in the client for displaying the electronic book can be varied, as long as the user can view the electronic book conveniently. For example, the read button or the download button can be placed at the top of the plurality of search results, or be placed in a prominent right position of the plurality of search results, or be placed in a prominent position in the middle of the plurality of search results, etc. For example, as shown in FIG. 6, after the user inputs the query "lagelangri", the corresponding electronic book may be displayed in a prominent right position of the plurality of search results responsive to the search of the "lagelangri", and then the user scans the two-dimensional code of the corresponding electronic book by the mobile terminal or other clients and downloads the electronic book by the mobile terminal or other clients.

As long as an electronic book reader or an application with a similar function is installed, the user will be able to open the electronic book which is downloaded by the mobile terminal or other clients at any time.

For the popular electronic book, for example, a community is established by the cloud server for a user reading or downloading the electronic book or the electronic book is published by the cloud server, if an amount of downloads or readings of the electronic book is greater than a preset threshold. That is, if an amount of downloads or readings of the electronic book reaches a preset amount, a small community can be established by the cloud server for the user reading or downloading the electronic book to communicate with each other, i.e. a post bar-style small community can be established by the cloud server for the user reading or downloading the electronic book to communicate with each other. In addition, the popular electronic book can be published by the cloud server if the amount of downloads or readings of the electronic book is greater than the preset threshold, i.e. the cloud server can publish the popular electronic book. In the above example, the preset threshold may be, for example, 500.

Due to the rapid changing of internet information, internet information often grows explosively, so every week the electronic book can be updated periodically according to the search results corresponding to the query associated with the electronic book, and the version number of the electronic book can be changed but the unique serial number PKN of the electronic book can be kept unchanged after each update. An update notification is sent to the user by the cloud server and the update electronic book is pushed to the user (e.g., the user who downloads the electronic book) by the cloud server if the electronic book is updated.

There are some cases, for example, when some information can be changed by the copyright owner, such as modifying wrongly written characters, or adding a new page or deleting a page, etc., the version number of the electronic book cannot be changed, only the corresponding page can be changed, so the user traffic can be saved.

With the system for providing the electronic book according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met. After the cloud server generates the electronic book by aggregating the plurality of search results, a usage efficiency of the user can be improved, in which, after demo is measured, the usage efficiency brought by quick page turning can be increased by up to three times, and after processed by the professional typesetting software, the pages in the electronic book can be more beautiful, so an enthusiasm of the user for reading can be greatly increased. In addition, the biggest problem in the Internet is less high-quality content, and the content of the electronic book can integrate the content which is provided by the copyright owner such as the author or publisher, such that: on one hand, the laborious high-quality content can be incorporated into the Internet, on the other hand, the enthusiasm of the user for reading or buying printed works can be stimulated, so benefits can be brought to the copyright owner. The search in the mobile terminal and the PC are significantly different in the requirement, the advantages and the disadvantages. With the system for providing the electronic book according to embodiments of the present disclosure, the plurality of search results can be easily moved from the PC to the mobile terminal, and the user can be able to read the search results anytime, anywhere, and individual needs can be met, and the phone traffic can be saved. Further, information promotion can be carried out with the system, for example, the electronic book can be used as an excellent platform for inserting the promotion information, which can be similar to the beautiful illustrations in magazine and can be integrated with the content in the electronic book, so the user can accept the promotion information more easily and are unlikely to be disgusted with the promotion information compared to the promotion information inserted in the search result, and a huge space for displaying the promotion information can be provided.

With the method and system for providing the electronic book and the cloud client according to embodiments of the present disclosure, by providing the plurality of search results for the user in the form of the electronic book after the plurality of search results are aggregated, the user can easily read the search results obtained in a previous search via the electronic book at anytime, anywhere, so an asynchronous function for viewing the search result can be achieved and an asynchronous viewing requirement of the user can be met.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment.

More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for providing an electronic book, comprising:
receiving a query;
performing a search according to the query; and
generating the electronic book according to a search result responsive to the search; and
displaying the electronic book as the search result, or sending the electronic book to a pre-specified client, a pre-specified network disk or a pre-specified mobile terminal;
and further comprising:
obtaining a piece of first copyright information of the plurality of search results and a piece of permission information of a user; and
generating a piece of second copyright information of the electronic book according to the piece of first copyright information and managing an operation permission of the user for the electronic book according to the piece of permission information of the user,
wherein managing the operation permission of the user for the electronic book according to the piece of permission information of the user comprises:
storing the electronic book in a cloud server as a mother book; and
generating a child book corresponding to the mother book according to the mother book and the type of the client and sending the child book to the client,
wherein the child book comprises a child information file and the child information file records a position of a page of a content in the child book in the mother book,
wherein the method further comprises:
receiving by the client an operation instruction; and
obtaining by the client a position of a content corresponding to the operation instruction in the mother book according to the child information file and obtaining by the client the content corresponding to the operation instruction from the cloud server according to the position.

2. The method according to claim 1, wherein the step of generating the electronic book according to a search result responsive to the search comprises:

aggregating a plurality of search results and generating the electronic book.

3. The method according to claim 1, wherein the step of aggregating a plurality of search results and generating the electronic book comprises:
    extracting a candidate search result from the plurality of search results;
    after deduplicating the candidate search result or removing an irrelevant content from the candidate search result, merging and automatically typesetting the candidate search result deduplicated or removed to generate the electronic book,
    wherein the step of extracting a candidate search result from the plurality of search results comprises:
    according to first similarities between the plurality of search results and the query, extracting the search result whose first similarity meets a preset first similarity request as the candidate search result; or
    according to source authoritative statuses of the plurality of search results, extracting the search result whose source authoritative status meets a preset request as the candidate search result; or
    according to a ranking result of the plurality of search results, extracting first M search results as the candidate search result, wherein M is a preset positive integer.

4. The method according to claim 1, further comprising:
    obtaining a type of the client and adjusting a layout mode of the electronic book according to the type of the client.

5. The method according to claim 1, further comprising:
    checking a content provided by a copyright owner and adding the content approved into the electronic book; or
    after calculating second similarities between the contents provided by the copyright owner and the query, adding the content provided by the copyright owner whose second similarity meets a preset second similarity request into the electronic book.

6. The method according to claim 1, further comprising:
    assigning a unique serial number to the electronic book after the electronic book is generated;
    changing a version number of the electronic book and keeping the unique serial number of the electronic book unchanged, if the electronic book is updated.

7. The method according to claim 1, wherein step S4 comprises:
    providing a read button or a download button for the electronic book on a search result page,
    wherein the read button or the download button is in a form of a two-dimensional code or a link.

8. The method according to claim 1, further comprising:
    establishing a community for a user reading or downloading the electronic book or publishing the electronic book, if an amount of downloads or readings of the electronic book is greater than a preset threshold;
    sending an update notification and pushing an updated electronic book, if the electronic book is updated.

9. A cloud server, comprising:
    a processor;
    a memory for storing instructions executable by the processor;
    wherein the processor is configured to:
    receive a query;
    perform a search according to the query;
    generate the electronic book according to a search result responsive to the search; and
    display the electronic book as the search result, or to send the electronic book to a pre-specified client, a pre-specified network disk or a pre-specified mobile terminal;
    the processor is further configured to:
    establish a community for a user reading or downloading the electronic book or to publish the electronic book, if an amount of downloads or readings of the electronic book is greater than a preset threshold; and
    send an update notification and push an updated electronic book, if the electronic book is updated.

10. The cloud server according to claim 9, wherein the processor is further configured to:
    perform the search according to the query to generate a plurality of search results; aggregate the plurality of search results and generate the electronic book,
    extract a candidate search result from the plurality of search results, and after deduplicating the candidate search result or removing an irrelevant content from the candidate search result, merge and automatically typeset the candidate search result deduplicated or removed to generate the electronic book.

11. The cloud server according to claim 10, the processor is further configured to:
    according to first similarities between the plurality of search results and the query, extract the search result whose first similarity meets a preset first similarity request as the candidate search result; or
    according to source authoritative statuses of the plurality of search results, extract the search result whose source authoritative status meets a preset request as the candidate search result; or
    according to a ranking result of the plurality of search results, extract first M search results as the candidate search result, wherein M is a preset positive integer.

12. The cloud server according to claim 10, the processor is further configured to:
    obtain a type of the client;
    adjust a layout mode of the electronic book according to the type of the client;
    obtain a piece of first copyright information of the plurality of search results and a piece of permission information of the user;
    generate a piece of second copyright information of the electronic book according to the piece of first copyright information and manage an operation permission of the user for the electronic book according to the piece of permission information of the user.

13. The cloud server according to claim 12, the processor is further configured to:
    store the electronic book in the cloud server as a mother book, generate a child book corresponding to the mother book according to the mother book and the type of the client, and send the child book to the client via the electronic book providing module,
    wherein the child book comprises a child information file and the child information file records a position of a page of a content in the child book in the mother book,
    wherein the client is configured to receive an operation instruction, to obtain a position of a content corresponding to the operation instruction in the mother book according to the child information file, and to obtain the content corresponding to the operation instruction from the cloud server according to the position.

14. The cloud server according to claim 9, the processor is further configured to:

check a content provided by a copyright owner and add the content approved into the electronic book; or after calculating second similarities between the contents provided by the copyright owner and the query, add the content provided by the copyright owner whose second similarity meets a preset second similarity request into the electronic book;

assign a unique serial number to the electronic book after the electronic book is generated, change a version number of the electronic book and keep the unique aerial number of the electronic book unchanged, if the electronic book is updated.

15. The cloud server according to claim 9, the processor is further configured to:

provide a read button or a download button for the electronic book on a search result page, wherein the read button or the download button is in a form of a two-dimensional code or a link.

\* \* \* \* \*